US007863837B2

(12) United States Patent
Tanaka et al.

(10) Patent No.: US 7,863,837 B2
(45) Date of Patent: Jan. 4, 2011

(54) DRIVE SYSTEM FOR ELECTRICALLY DRIVEN DUMP TRUCK

(75) Inventors: Yasuo Tanaka, Yokohama (JP); Tomohiko Yasuda, Kashiwa (JP); Takashi Yagyu, Ushiku (JP); Yutaka Watanabe, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 137 days.

(21) Appl. No.: 12/091,995

(22) PCT Filed: May 7, 2007

(86) PCT No.: PCT/JP2007/059453

§ 371 (c)(1), (2), (4) Date: Apr. 29, 2008

(87) PCT Pub. No.: WO2007/135849

PCT Pub. Date: Nov. 29, 2007

(65) Prior Publication Data

US 2009/0251090 A1    Oct. 8, 2009

(30) Foreign Application Priority Data

May 24, 2006    (JP)    ............................. 2006-144378

(51) Int. Cl.
*H02P 5/00*    (2006.01)
(52) U.S. Cl. ............................. 318/66; 318/34; 318/140; 318/148
(58) Field of Classification Search .................. 318/34, 318/55, 59, 64, 66, 140, 146, 148, 153, 430, 318/432; 180/65.1, 65.3, 65.5
See application file for complete search history.

(56) References Cited

U.S. PATENT DOCUMENTS

| 5,280,223 | A | * | 1/1994 | Grabowski et al. ........... 318/139 |
| 5,289,890 | A | * | 3/1994 | Toyoda et al. .............. 180/65.8 |
| 5,939,846 | A | * | 8/1999 | Young et al. .................. 318/98 |
| 5,988,307 | A | * | 11/1999 | Yamada et al. ............... 180/243 |
| 6,340,847 | B1 | * | 1/2002 | Kawabata et al. .......... 290/40 C |
| 2003/0080704 | A1 | | 5/2003 | Wakitani et al. | |

FOREIGN PATENT DOCUMENTS

| JP | 10-051905 | 2/1998 |
| JP | 2001-107762 | 4/2001 |
| JP | 2003-143706 | 5/2003 |

* cited by examiner

*Primary Examiner*—Bentsu Ro
*Assistant Examiner*—Thai Dinh
(74) *Attorney, Agent, or Firm*—Mattingly & Malur, P.C.

(57) ABSTRACT

A drive system for an electrically driven dump truck is capable of enabling electric motors for traveling to make full use of the output horsepower of the prime mover up to an output limit of the prime mover. A target motor horsepower corresponding to an operation amount of an accelerator pedal is calculated and an available maximum horsepower for the electric motors out of the maximum output horsepower of the prime mover is calculated in response to the actual revolution speed of the prime mover. The horsepower coefficient corresponding to the instantaneous revolution speed deviation is calculated. The available maximum horsepower for the electric motors is modified by the horsepower coefficient to determine a second target motor horsepower. The target motor horsepower is limited to not exceed the second target motor horsepower so as to control the torque of the electric motors.

8 Claims, 12 Drawing Sheets

DRIVE SYSTEM FOR ELECTRICALLY DRIVEN DUMP TRUCK

TECHNICAL FIELD

The present invention relates to a drive system for an electrically driven dump truck, and more particularly to a drive system for a large dump truck that drives an electric generator by a prime mover, and that drives an electric motor for traveling by the electric power so as to cause the dump truck to travel, the electric power being generated by the electric generator.

BACKGROUND ART

As described in, for example, a patent document 1, a drive system for an electrically driven dump truck includes: a prime mover; an electronic governor for controlling the revolution speed and torque of the prime mover; an alternating-current generator driven by the prime mover; two electric motors, each of which is driven by the electric power supplied by the alternating-current generator, the two electric motors driving, for example, right and left rear wheels; two inverters, each of which is connected to the alternating-current generator, and each of which controls each of the electric motors (for example, induction motors); and a control unit for calculating the target revolution speed corresponding to the operation amount of an accelerator pedal to control the electronic governor, and for controlling the two inverters in response to the operation amount of the accelerator pedal to control each of the electric motors.

Patent document 1: JP-A-2001-107762

DISCLOSURE OF INVENTION

Problems to be Solved by the Invention

In the electrically driven dump truck as described in the patent document 1, the prime mover drives not only the electric generator for driving the electric motors but also loads other than the electric generator. For example, the loads other than the electric generator includes: an oil hydraulic pump for moving a vessel of a dump truck up and down, and for driving hydraulic equipment used for steering operation; a cooling fan for sending air to a radiator; and a second electric generator for driving an electric fan used to cool the electric motors for traveling and a control unit. For this reason, the control unit predetermines, as the loss horsepower, the horsepower required to drive the prime mover loads other than the electric generator, and sets a value obtained by subtracting the loss horsepower from the maximum output horsepower, which can be output by the prime mover, as the available maximum horsepower (an assignment value of the horsepower) for the electric motors for traveling. With the maximum horsepower being used as an upper limit, the control unit calculates the target horsepower of the electric motors so that the target horsepower does not exceed the upper limit. In this case, if the loss horsepower is set at a steady value, there is a possibility that the total consumed horsepower obtained by adding up the consumed horsepower of the electric motors and the consumed horsepower of the other prime mover loads (an actual value of the loss horsepower) will exceed the output horsepower of the prime mover during traveling, causing the prime mover to stall. Therefore, it is necessary to set the loss horsepower at a larger value having a sufficient margin. As a result, there occurs such a malfunction that although the prime mover leaves a sufficient margin for output, it is not possible to make full use of the margin for the output of the electric motors for traveling.

An object of the present invention is to provide a drive system for an electrically driven dump truck, which is capable of preventing a prime mover from stalling, and which is capable of enabling electric motors for traveling to make full use of the output horsepower of the prime mover up to an output limit of the prime mover.

Means for Solving the Problems (1) In order to achieve the above object, according to one aspect of the present invention, there is provided a drive system for an electrically driven dump truck comprising: a prime mover; an electronic governor for controlling the revolution speed and torque of the prime mover; an alternating-current generator driven by the prime mover; prime mover loads other than the alternating-current generator, driven by the prime mover; at least two electric motors for traveling, each of which is driven by the electric power supplied by the alternating-current generator; and at least two inverters, each of which is connected to the alternating-current generator, and each of which controls each of the electric motors, wherein the drive system comprises target revolution speed calculation means for calculating the target revolution speed corresponding to the operation amount of an accelerator pedal, and motor control means for controlling the inverters to control the electric motors in response to the operation amount of the accelerator pedal; the electronic governor is configured to control the fuel injection amount for the prime mover on the basis of the target revolution speed and is set such that when the target revolution speed is set at least at the maximum revolution speed, the control of the fuel injection amount becomes a droop control; and the motor control means includes: first target motor horsepower calculation means for calculating a first target motor horsepower corresponding to the operation amount of the accelerator pedal; second target motor horsepower calculation means including speed sensing control means for modifying an available maximum horsepower for the electric motors for traveling such that the available maximum horsepower increases when the actual revolution speed of the prime mover is higher than the target revolution speed, and the increased maximum horsepower decreases with the decrease in the actual revolution speed of the prime mover, said second target motor horsepower calculation means for determining, as a second target motor horsepower, the available maximum horsepower that has been modified by the speed sensing control means; target motor horsepower limiting means for limiting the first target motor horsepower so that the first target motor horsepower does not exceed the second target motor horsepower, thereby to generate a third target motor horsepower; and inverter control means for determining a first target motor torque of each of the two electric motors (12R, 12L) on the basis of the third target motor horsepower, thereby to control the inverters.

In the drive system according to the present invention, which is configured as described above, if the consumed horsepower of prime mover loads other than the alternating-current generator is small, the second target motor horsepower calculation means detects the small consumed horsepower in question by the revolution speed deviation, and then makes a modification so that the available maximum horsepower for the electric motors for traveling is increased. Accordingly, the second target motor horsepower which is a limit value of the target horsepower of the electric motors is increased. As a result, it is possible to make full use of the output horsepower up to the output limit of the prime mover so that the electric motors can be driven by the output horsepower. In addition, if the consumed horsepower of prime mover loads other than the alternating-current generator increases, the second target motor horsepower calculation means detects the increase in consumed horsepower by the revolution speed deviation, and then makes a modification so that the maximum horsepower which has been increased is decreased. Accordingly, the second target motor horsepower which is a limit value of the target horsepower of the electric motors is decreased to reduce the consumed horsepower of the electric motors. As a result, it is possible to avoid the overload of the prime mover, and thereby to prevent the prime mover from stalling.

(2) In the above-described item (1), it is desirable that when the target revolution speed of the prime mover is set at least at the maximum revolution speed, the speed sensing control means function, and that in all other cases, the speed sensing control means do not function.

As a result, as described above, when the revolution speed of the prime mover is set at least at the maximum revolution speed, the second target motor horsepower calculation means modifies the available maximum horsepower for the electric motors for traveling, in response to the revolution speed deviation, and performs the control (speed sensing control) of increasing/decreasing the second target motor horsepower that is a limit value of the target horsepower of the electric motors. Therefore, it is possible to prevent the prime mover from stalling, and to enable the electric motors for traveling to make full use of the output horsepower of the prime mover up to an output limit of the prime mover. When the revolution speed of the prime mover is at least lower than the maximum revolution speed, the second target motor horsepower calculation means calculates the second target motor horsepower without modifying the available maximum horsepower for the electric motors for traveling. Therefore, when the accelerator pedal is pressed down from a half position to increase the amount of pressing, a malfunction is not caused by the speed sensing control. Accordingly, it is possible to smoothly accelerate the electric motors in response to the operation of pressing down the accelerator pedal.

(3) In addition, in the above-described item (1) or (2), it is desirable that the second target motor horsepower calculation means further include maximum horsepower calculation means for subtracting, from a maximum output horsepower which can be output by the prime mover, the loss horsepower required to drive the prime mover loads other than the alternating-current generator so as to determine the available maximum horsepower for the electric motors for traveling.

(4) In the above-described item (3), it is desirable that the maximum horsepower calculation means calculate the maximum output horsepower, and the loss horsepower, corresponding to an instantaneous actual revolution speed on the basis of a first function of the actual revolution speed of the prime mover and the maximum output horsepower thereof, and a second function of the actual revolution speed of the prime mover and the loss horsepower thereof.

(5) In addition, in the above-described steps (1) through (4), it is desirable that when a value obtained by subtracting the target revolution speed of the prime mover from the actual revolution speed of the prime mover is defined as a revolution speed deviation, the speed sensing control means calculate a horsepower modification value, which decreases with the decrease in the revolution speed deviation from a positive value to a negative value, on the basis of a third function of the revolution speed deviation and the horsepower modification value, and then modifies the available maximum horsepower for the electric motors by using this horsepower modification value.

(6) In the above-described item (5), it is desirable that the horsepower modification value be a horsepower coefficient, and that the speed sensing control means multiply the horsepower coefficient by the available maximum horsepower for the electric motors, so as to determine the second target motor horsepower.

(7) Moreover, in the above-described steps (1) through (6), it is desirable that the speed sensing control means modifies the available maximum horsepower for the electric motors such that the maximum horsepower is increased by a factor ranging from 1.1 to 1.3 times, when the actual revolution speed of the prime mover is equivalent to the target revolution speed.

(8) Furthermore, in the above-described steps (1) through (7), it is desirable that the inverter control means calculates a first target motor torque from the third target motor horsepower and an instantaneous rotational speed of the electric motors, calculates an upper limit of a target motor torque on the basis of an actual rotational speed of the electric motors, limits the first target motor torque so that the first target motor torque does not exceed the upper limit of the target motor torque, thereby to determine a second target motor torque, and then controls the inverters on the basis of the second target motor torque.

EFFECTS OF INVENTION

According to the present invention, it is possible to prevent a prime mover from stalling, and to enable electric motors for traveling to make full use of the output horsepower of the prime mover up to an output limit of the prime mover.

In addition, according to the present invention, when the revolution speed of the prime mover is set at least at the maximum revolution speed, it is possible to prevent the prime mover from stalling as described above, and to enable the electric motors for traveling to make full use of the output horsepower of the prime mover up to an output limit of the prime mover. On the other hand, when the revolution speed of the prime mover is at least lower than the maximum revolution speed, it is possible to smoothly accelerate the electric motors in response to the operation of pressing down an accelerator pedal without causing a malfunction.

DESCRIPTION OF REFERENCE NUMBERS

Figure 1:
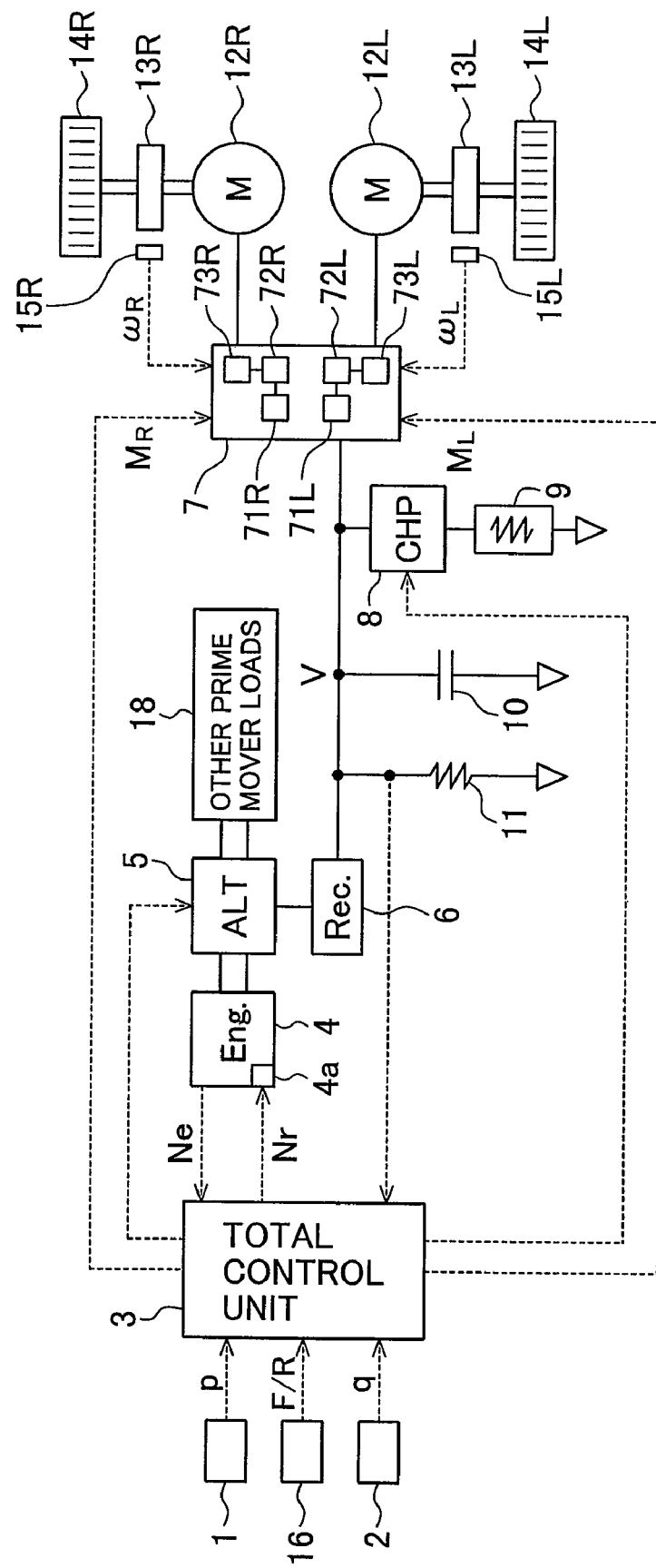
FIG. 1 is a diagram illustrating an overall configuration of a drive system for an electrically driven dump truck according to one embodiment of the present invention.

1: Accelerator pedal
2: Retard pedal
3: Total control unit
4: Prime mover (diesel engine)
5: Alternating-current generator
6: Rectifying circuit
7: Inverter control unit
8: Chopper circuit
9: Grid resistor
10: Capacitor
11: Resistor used to detect the voltage after rectification
12R, 12L: Right and left electric motors (induction motors)
13R, 13L: Speed reducer
14R, 14L: Right and left rear wheels (tires)
15R, 15L: Electromagnetic pickup sensors
16: Shift lever
18: Other prime mover loads
71R, 71L: Torque instruction operation units
72R, 72L: Motor control operation units
73R, 73L: Inverters (switching elements)
Mr1: The target motor horsepower (the first target motor horsepower)
Mr2: The target motor horsepower (the available maximum horsepower for the electric motors)
Mr3: The target motor horsepower (the second target motor horsepower)
Mr: The target motor horsepower (the third target motor horsepower)

BEST MODE FOR CARRYING OUT THE INVENTION

One embodiment of the present invention will be described with reference to drawings as below.

FIG. 1 is a diagram illustrating an overall configuration of a drive system for an electrically driven dump truck according to one embodiment of the present invention.

In FIG. 1, the drive system for the electrically driven dump truck includes: an accelerator pedal 1; a retard pedal 2; a shift lever 16; a total control unit 3; a prime mover 4; an alternating-current generator 5; other prime mover loads 18; a rectifying circuit 6; an inverter control unit 7; a chopper circuit 8; a grid resistor 9; a capacitor 10; a resistor 11; right and left electric motors (for example, induction motors) 12R, 12L; speed reducers 13R, 13L; tires 14R, 14L; and electromagnetic pickup sensors 15R, 15L. The inverter control unit 7 includes: torque instruction operation units 71R, 71L that are used for the right and left electric motors 12R, 12L respectively; motor control operation units 72R, 72L; and inverters (switching elements) 73R, 73L.

A manipulate signal p of the accelerator pedal 1 and a manipulate signal q of the retard pedal 2 are inputted into the total control unit 3. The manipulate signals p and q become a signal for controlling the magnitude of the driving force, and a signal for controlling the magnitude of the retard force, respectively.

When the accelerator pedal 1 is pressed down to cause the dump truck to move forward or backward, the total control unit 3 outputs, to the prime mover 4, an instruction indicating the target revolution speed Nr. On the prime mover 4 side, the actual revolution speed Ne is detected by a revolution speed sensor, which is not illustrated. Then, a signal indicating the actual revolution speed Ne is returned from the prime mover 4 to the total control unit 3. The prime mover 4 is a diesel engine that is equipped with an electronic governor 4a. When the electronic governor 4a receives an instruction indicating the target revolution speed Nr, the electronic governor 4a controls the fuel injection amount so that the prime mover 4 revolves at the target revolution speed Nr.

The alternating-current generator 5 is connected to the prime mover 4. The alternating-current generator 5 performs alternating current generation. The electric power obtained by the alternating current generation is rectified by the rectifying circuit 6 before the electric power is accumulated in the capacitor 10. A direct-current voltage value becomes V. The alternating-current generator 5 feeds back a voltage value, into which the direct-current voltage V is divided by the detection resistor 11. The total control unit 3 controls the alternating-current generator 5 so that the voltage value in question becomes a specified constant voltage V0.

The electric power generated by the alternating-current generator 5 is supplied to the right and left electric motors 12R, 12L through the inverter control unit 7. By controlling the alternating-current generator 5 so that the direct-current voltage V which has been rectified by the rectifying circuit 6 becomes the specified constant voltage V0, the total control unit 3 controls the supply of the electric power so that the electric power required for the electric motors 12R, 12L is supplied.

The horsepower MR, ML of the right and left electric motors 12R, 12L, which is instructed from the total control unit 3, and the rotational speed ωR, ωL of the electric motors 12R, 12L, which is detected by the electromagnetic pickups 15R, 15L, are inputted into the inverter control unit 7. Then, the inverter control unit 7 drives the electric motors 12R, 12L at a slip ratio of greater than 0 through the torque instruction operation units 71R, 71L, the motor control operation units 72R, 72L, and the inverters (switching elements) 73R, 73L respectively.

The right and left rear wheels (tires) 14R, 14L are connected to the electric motors 12R, 12L through the speed reducers 13R, 13L respectively. The electromagnetic pickups 15R, 15L are typically sensors for detecting the peripheral speed of one gear teeth included in the speed reducers 13R, 13L respectively. In addition, for example, if the right side driving system is taken as an example, a gear used for detection may also be given to a driving shaft inside the electric motor 12R, or to a driving shaft to which the speed reducer 13R and the tire 14R are connected, so that the electromagnetic pickup 15R is located at the position of the gear.

When the accelerator pedal 1 is released to press down on the retard pedal 2 during traveling, the total control unit 3 controls the alternating-current generator 5 so that the alternating-current generator 5 does not generate electricity. Moreover, because the horsepower instructions MR, ML issued from the total control unit 3 become negative, the inverter control unit 7 applies the brake force to a car body which travels by driving each of the electric motors 12R, 12L at a slip ratio of greater than 0. At this time, each of the electric motors 12R, 12L acts as an electric generator. Accordingly, each of the electric motors 12R, 12L works so that the capacitor 10 is charged by a rectifying function that is built-into the inverter control unit 7. The chopper circuit 8 works so that the direct-current voltage value V becomes a predetermined direct-current voltage value V1. As a result, an electric current is fed to the grid resistor 9 to transform the electric energy into the thermal energy.

Figure 2:
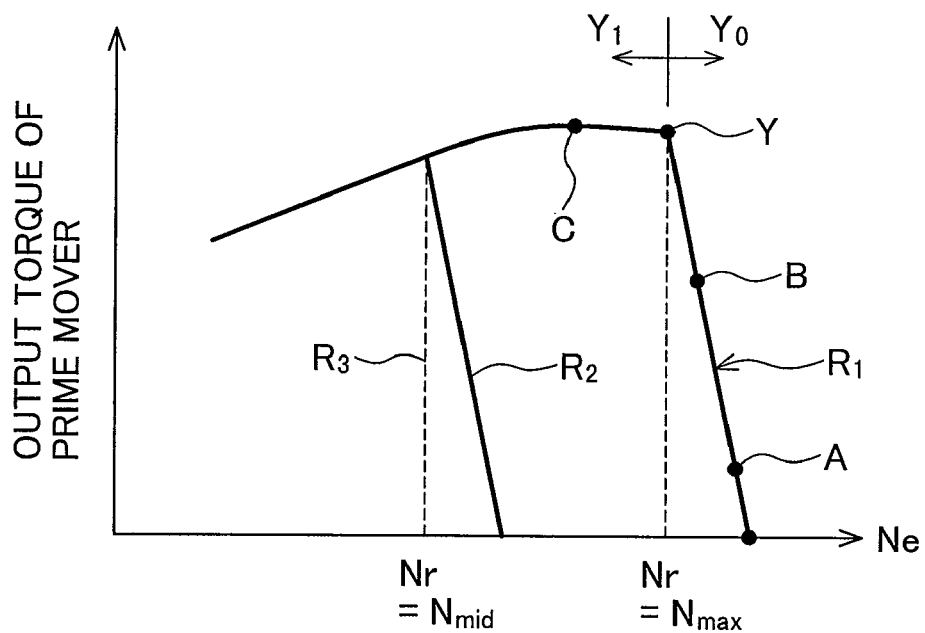
FIG. 2 is a diagram illustrating the relationship between the actual revolution speed of a prime mover and the output torque thereof.
Figure 3:
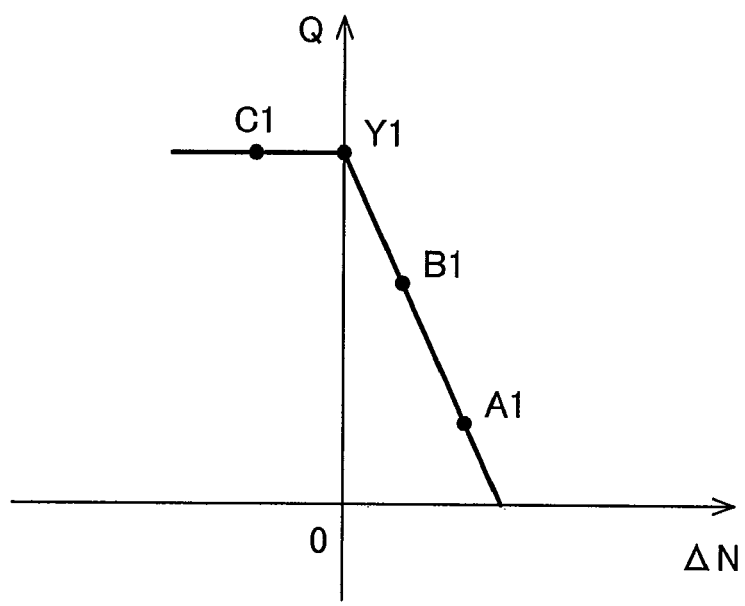
FIG. 3 is a diagram illustrating fuel injection characteristics of an electronic governor.

Here, torque characteristics of the prime mover 4 will be described. FIG. 2 is a diagram illustrating the relationship between the revolution speed Ne (the actual revolution speed) and output torque Te of the prime mover 4. FIG. 3 is a diagram illustrating fuel injection characteristics of the electronic governor 4a.

The electronic governor 4a of the prime mover 4 according to this embodiment is so configured that when the target revolution speed Nr is at least equivalent to the maximum revolution speed (the rated revolution speed) Nrmax, more specifically, when Nr=Nrmax (for example, 2000 rpm), the control of the fuel injection amount becomes the droop control. When the target revolution speed Nr is lower than the maximum revolution speed (the rated revolution speed) Nrmax, more specifically, when Nr<Nrmax, the droop control or the isochronous control may be selected. However, it is desirable that the isochronous control whose fluctuations in revolution speed are small be selected.

In FIG. 2, straight lines R1, R2, R3 indicate torque characteristics of the prime mover 4 in a control area of the electronic governor 4a. To be more specific, the straight line R1 indicates characteristics obtained when the droop control is set on the condition that Nr=Nrmax; the straight line R2 indicates characteristics obtained when the droop control is set on the condition that Nr=Nrmid (<Nrmax); and the straight line R3 indicates characteristics obtained when the isochronous control is set on the condition that Nr=Nrmid (<Nmax).

The droop control will be described.

It is assumed that the prime mover 4 operates at a point A on the straight line R1 of an area Y0 in a state in which Nr=Nrmax. If a load put on the prime mover 4 increases starting from this state, the electronic governor 4a increases the amount of injected fuel in response to the increase in load so that the output torque is increased. When the output torque of the prime mover 4 becomes equivalent to the specified amount, the output torque of the prime mover 4 balances, for example, at a point B. If the prime mover load further increases, the output torque of the prime mover 4 reaches a point Y. The point Y is a point at which the fuel injection amount becomes the maximum. Accordingly, it is not possible to increase the output torque of the prime mover 4 any more. If the load put on the prime mover 4 further increases, the output torque of the prime mover 4 reaches a point C of an area Y1, where the prime mover 4 will stall in a short time. Thus, the area Y0 (control area of the electronic governor 4a) indicates a state in which the prime mover 4 leaves a sufficient margin for output. On the other hand, the area Y1 (area outside the control area of the electronic governor 4a) indicates a state in which the prime mover 4 leaves no margin for output.

The straight line R1 of the droop control has specified inclination. On this straight line R1, the electronic governor 4a controls the fuel injection amount so that the output torque is increased with the revolution speed Ne of the prime mover being decreased.

Similarly, the straight line R2 of the droop control also has specified inclination. On this straight line R2, the electronic governor 4a controls the fuel injection amount so that the output torque is increased with the revolution speed Ne of the prime mover being decreased.

In the case of the isochronous control, as shown in the straight line R3 of FIG. 2, in contrast to the droop control, the torque is not changed by a range of change in revolution speed. Ideally, the fuel injection amount is controlled so that the prime mover always operates in a state in which Nr=Ne. However, an actual electronic governor has a range of change in revolution speed, whose value approximately ranges from 10 to 20 rpm.

When the droop control is performed in a state in which Nr=Nrmax, the electronic governor 4a controls the fuel injection amount so that $\Delta N$ (=Ne−Nr) becomes equivalent 0. Here, $\Delta N$ is a revolution speed deviation, which is a deviation of the actual revolution speed Ne from the target revolution speed Nr. FIG. 3 is a chart illustrating the relationship between the instantaneous revolution speed deviation $\Delta N$ and the fuel injection amount Q. Here, points A1, B1, Y1, C1 correspond to the points A, B, Y, C shown in FIG. 2 respectively. With the increase in load torque of each of the electric motors 12R, 12L, which causes the revolution speed deviation $\Delta N$ (>0) to decrease, the fuel injection amount increases as follows: A1->B1->Y1. In response to this, an operating point of the prime mover 4 changes as follows: A->B->Y. Because the fuel injection amount does not increase to a value that is higher than the point Y1, if the load of the prime mover 4 exceeds the point Y1, the operating point changes as follows: Y->C. Accordingly, if the load further increases from this state, the prime mover 4 will stall.

When the isochronous control is performed in a state in which Nr<Nrmax, the electronic governor 4a calculates a ratio (load factor) of the current load torque to the maximum output torque of the prime mover corresponding to the instantaneous target revolution speed. The electronic governor 4a then uses the load factor to control the fuel injection amount so that $\Delta N$ (=Ne−Nr) becomes equivalent to 0.

Up to this point, the basic configuration of the usual electrically driven dump truck has been described.

Next, characteristic part of the present invention will be described.

Figure 4:
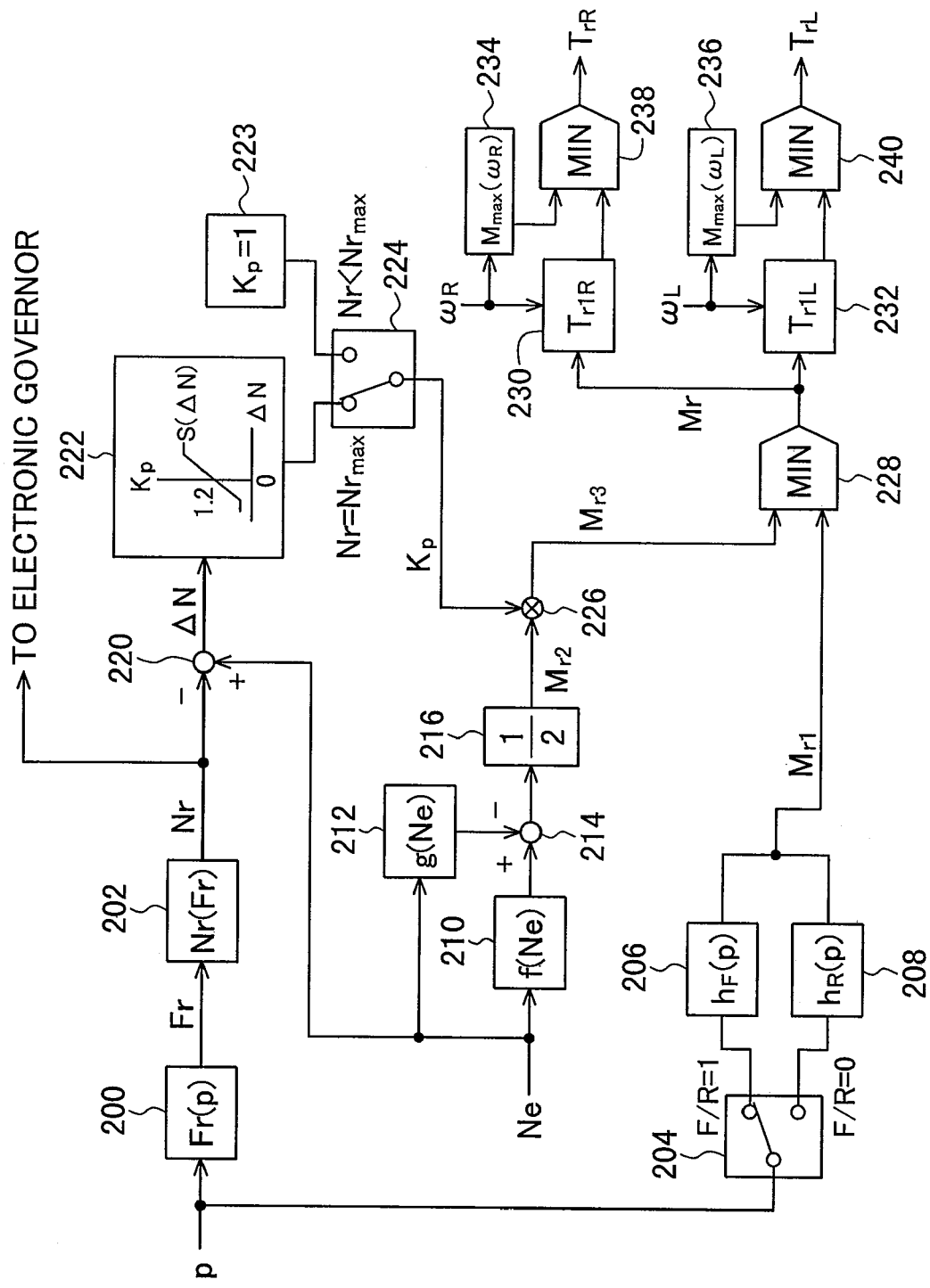
FIG. 4 is a functional block diagram illustrating processing steps.
Figure 5:
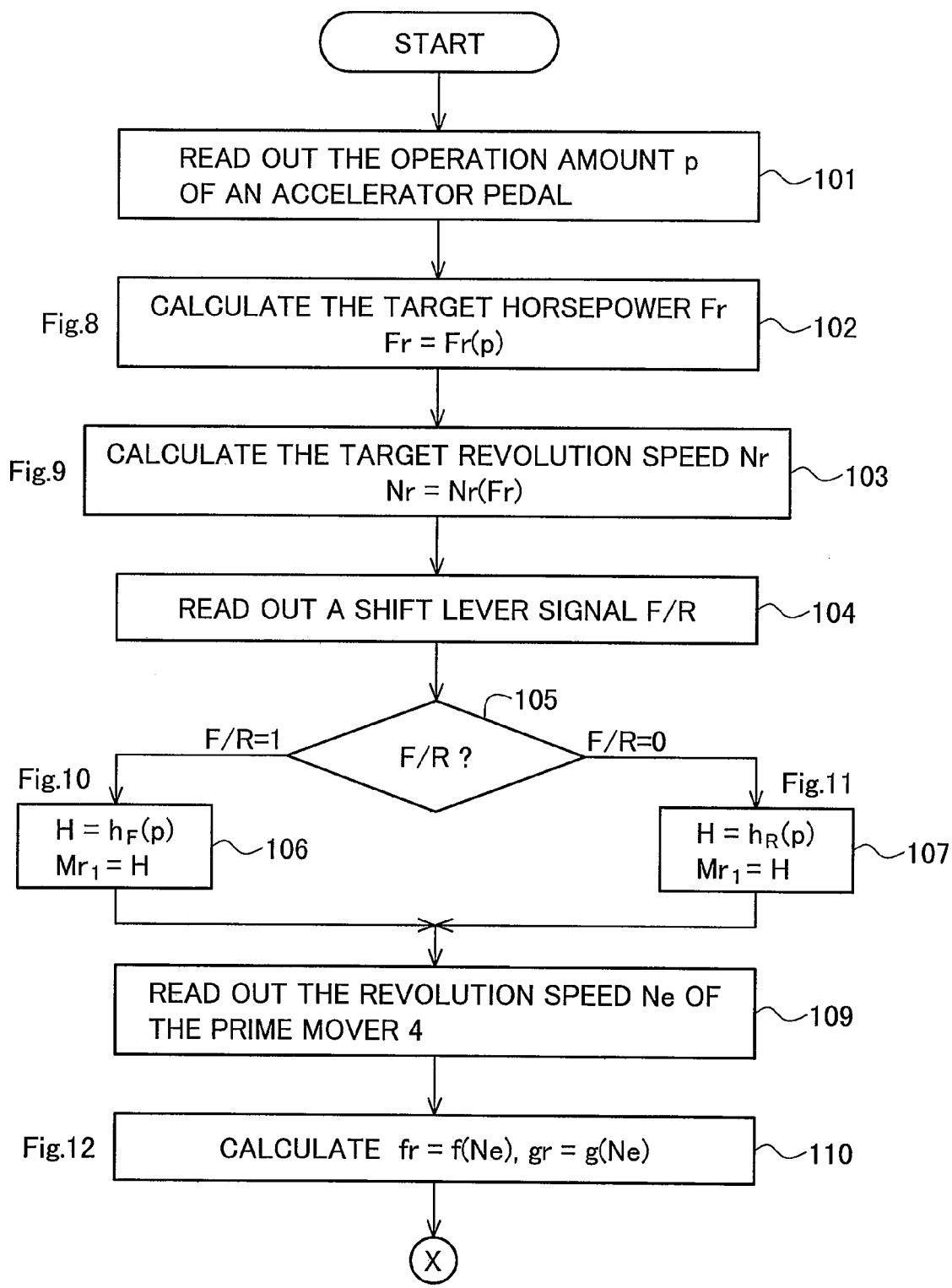
FIG. 5 is a flowchart illustrating processing steps.
Figure 6:
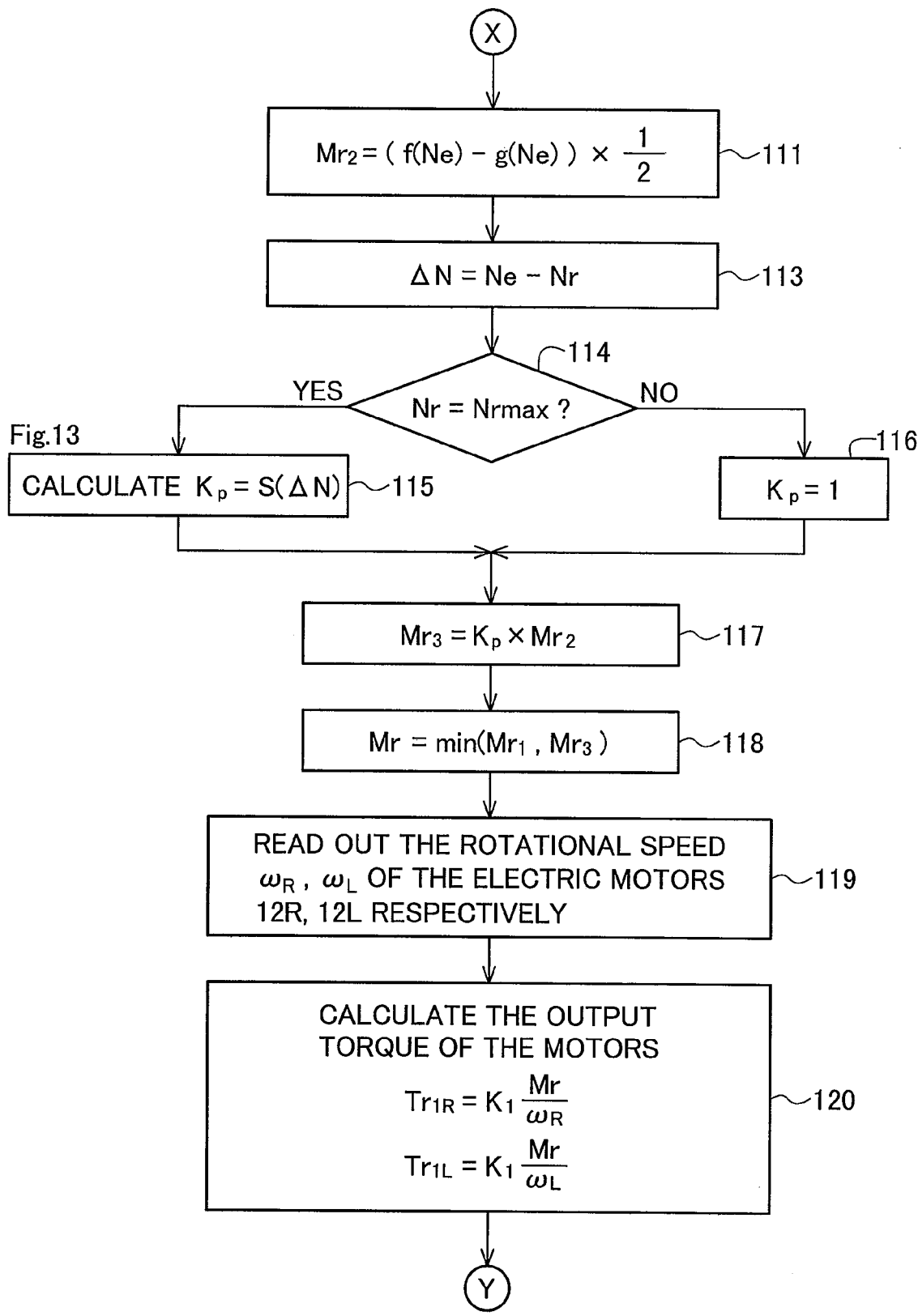
FIG. 6 is a flowchart illustrating processing steps.
Figure 7:
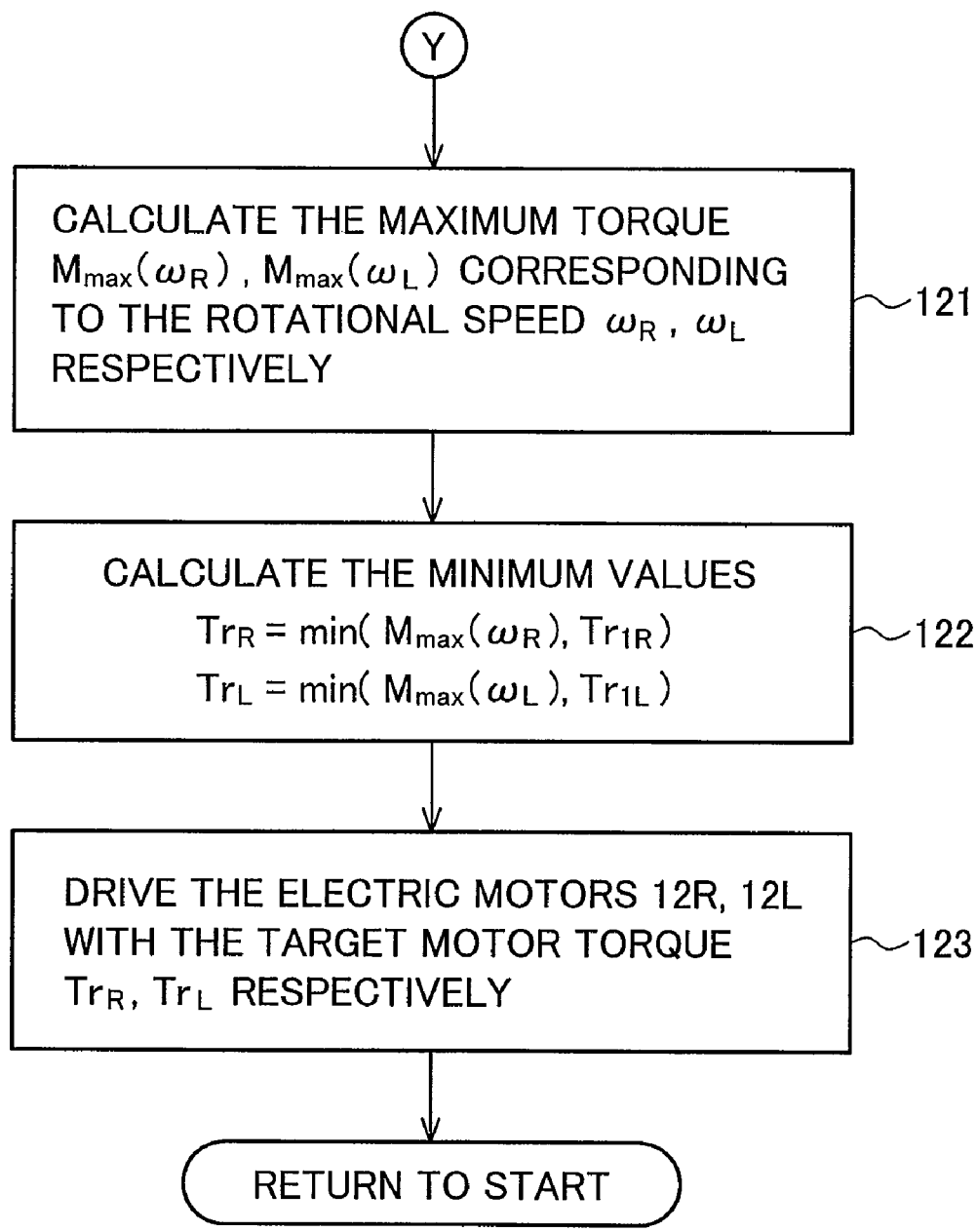
FIG. 7 is a flowchart illustrating processing steps.

According to the present invention, operation of each component is subjected to arithmetic processing according to processing steps stored in a memory, which is not illustrated. The memory is built into the total control unit 3 and the inverter control unit 7. FIG. 4 is a functional block diagram illustrating the processing steps. FIGS. 5 through 7 are flowcharts each illustrating the processing steps. The processing steps will be described mainly according to the flowcharts shown in FIGS. 5 through 7, and supplementarily by use of the functional block diagram shown in FIG. 4, as below.

According to the process flow shown in FIGS. 5 through 7, the process starts from START; and when the processing steps are performed up to END, the process returns to START again.

Figure 8:
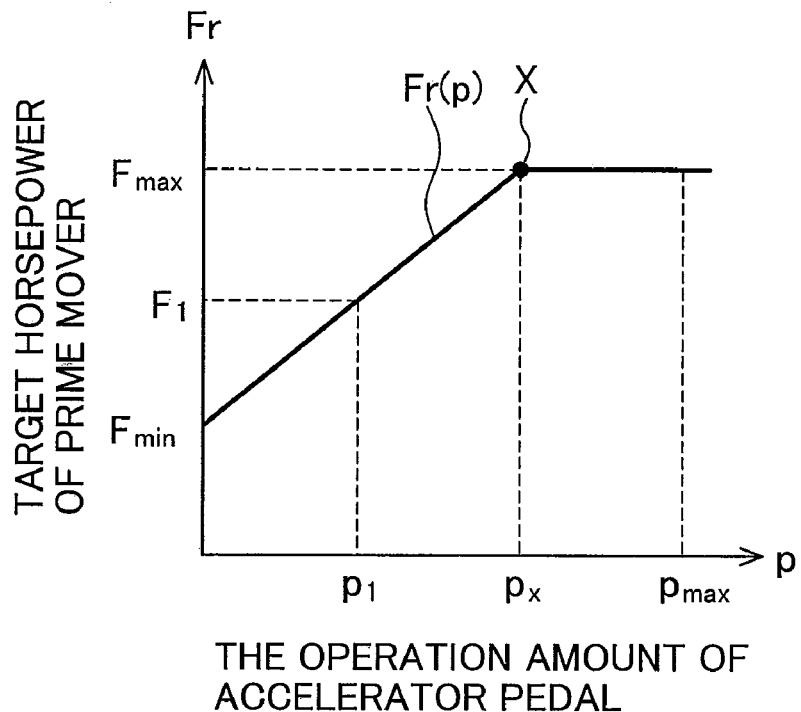
FIG. 8 is a chart illustrating a function Fr(p) of the accelerator operation amount and the target prime mover horsepower.

In steps 101, 102, the operation amount of an accelerator pedal (hereinafter referred to as the accelerator operation amount) p is read out. From this accelerator operation amount p, a target prime mover horsepower Fr corresponding to the accelerator operation amount p is calculated with reference to a data map stored in a memory (a block 200 shown in FIG. 4). The data map shows the relationship between the accelerator operation amount and the target prime mover horsepower, the relationship being expressed by a function Fr(p) shown in FIG. 8. The function Fr(p) is set so that if the accelerator operation amount p changes from 0, which means no operation, to pmax that is the maximum, a target horsepower Fr of the prime mover 4 changes from Fmin to Fmax as shown in FIG. 8. For example, in FIG. 8, if the accelerator operation amount is p1, Fr=F1. In addition, at a point X at which the accelerator operation amount p is lower than pmax, the target prime mover horsepower Fr reaches Fmax that is the maximum. The accelerator operation amount px at the point X is, for example, about 90% of the maximum operation amount pmax.

Figure 9:
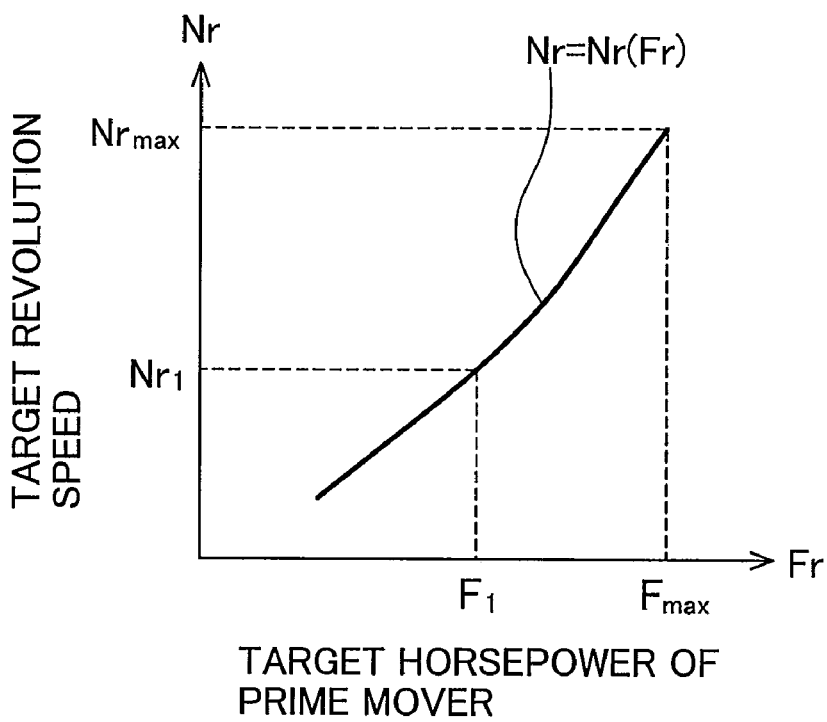
FIG. 9 is a chart illustrating a function Nr(Fr) of the target horsepower and the target revolution speed.

In a step 103, from the target prime mover horsepower Fr, the target revolution speed Nr of the prime mover 3 corresponding to the target prime mover horsepower Fr is calculated with reference to a data map stored in the memory (a block 202 shown in FIG. 4). The data map shows the relationship between the target horsepower and the target revolution speed, and is expressed by a function Nr(Fr) shown in FIG. 9. Here, the function Nr(Fr) shown in FIG. 9 is an inverse function of the function fr=f(Nr) of the relationship between the target revolution speed of the prime mover 4 and the output horsepower, which will be described later. For example, in FIG. 9, if the target prime mover horsepower is F1, Nr=Nr1. On the other hand, if the target prime mover horsepower is Fmax, Nr=Nrmax (for example, 2000 rpm). The target revolution speed Nr is transmitted to the prime mover 4 as an instruction of the electronic governor 4a. As a result, the prime mover 4 is driven so that the prime mover 4 revolves at the target revolution speed Nr.

In a step 104, the state quantity F/R indicating a state of a position of the shift lever 16 is inputted. There are three switching positions of the shift lever 16, which are N (neutral), F (forward), and R (reverse). However, because the traveling control is not performed at the neutral position, the state quantity F/R is inputted here. At the time of forward traveling, a value of the state quantity F/R is equivalent to 1 (F/R=1). On the other hand, at the time of backward traveling, a value of the state quantity F/R is equivalent to 0 (F/R=0).

Figure 10:
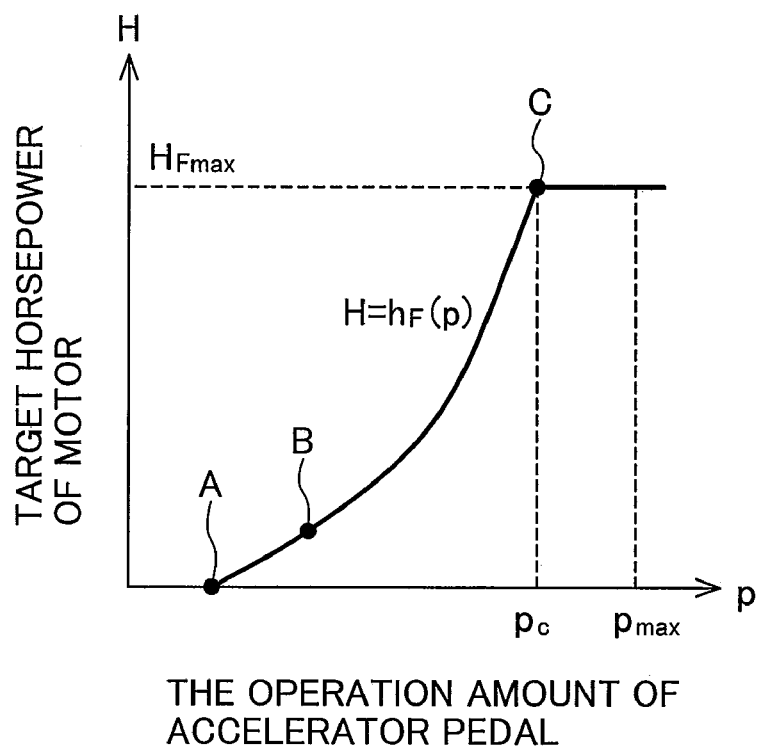
FIG. 10 is a chart illustrating a function hF(p) of the accelerator operation amount for traveling forward and the target motor horsepower.
Figure 11:
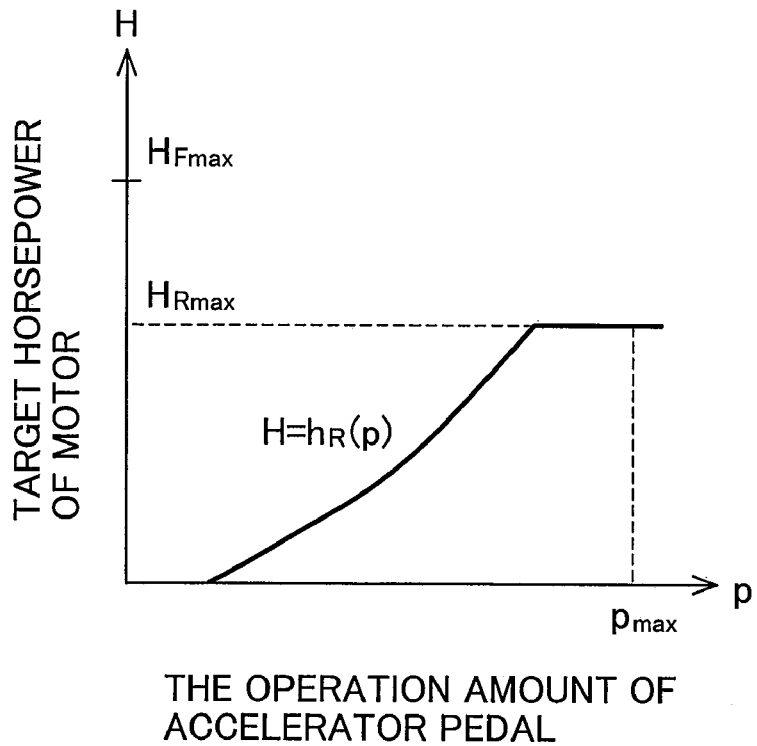
FIG. 11 is a chart illustrating a function hR(p) of the accelerator operation amount for traveling backward and the target motor horsepower.

In steps 105, 106, 107, fundamental target horsepower Mr1 of each of the electric motors 12R, 12L is calculated on the basis of F/R. To be more specific, if F/R=1, a data map stored in the memory, which shows the relationship between the accelerator operation amount for traveling forward and the target motor horsepower, is read out. The relationship is expressed by a function hF(p) shown in FIG. 10. Then, with reference to this function hF(p), the target motor horsepower H (=Mr1) corresponding to the accelerator operation amount p is calculated (blocks 204, 206 shown in FIG. 4). If F/R=0, a data map stored in the memory, which shows the relationship between the accelerator operation amount for traveling backward and the target motor horsepower, is read out. The relationship is expressed by a function hR(p) shown in FIG. 11. Then, with reference to this function hR(p), the target motor horsepower H (=Mr1) corresponding to the accelerator operation amount p is calculated (blocks 204, 208 shown in FIG. 4). In this embodiment, the function hF(p) used for traveling forward shown in FIG. 10 is set as follows: if the accelerator operation amount p=0, the target motor horsepower H=0; in a state in which the accelerator pedal is slightly pressed down, more specifically, starting from a point A shown in FIG. 10, H increases; an increase rate of H is increased from a point B; and at a point C at which the accelerator operation amount is lower than pmax, H reaches the maximum horsepower HFmax that can be generated by each of the electric motors 12R, 12L. In the case of the function hR(p) shown in FIG. 11, with the increase in the accelerator operation amount p, the target motor horsepower H increases. However, the maximum value HRmax of the target motor horsepower is set at a value that is smaller than the maximum value HFmax of the function hF(p) used for traveling forward. Incidentally, the target motor horsepower for traveling backward may also be determined by multiplying the target motor horsepower, which has been determined by the function hF(p) used for traveling forward, by a positive constant whose value is smaller than 1. The accelerator operation amount pc at the point C shown in FIG. 10 is, for example, about 95% of the maximum operation amount pmax.

In a step 109, the actual revolution speed Ne of the prime mover 4 is read out. Then, in a step 110, with reference to a data map of the revolution speed and the maximum output horsepower of the prime mover 4, the relationship being expressed by a function f(Ne) shown in FIG. 12, and with reference to a data map of the revolution speed and the other prime mover load loss horsepower, the relationship being expressed by a function g(Ne) shown in FIG. 12, both of the data maps being stored in the memory, the maximum output horsepower f(Ne) of the prime mover 4 corresponding to the actual revolution speed Ne of the prime mover 4, and loss horsepower g(Ne) of the other prime mover loads 18 corresponding to the actual revolution speed Ne of the prime mover 4, are calculated (blocks 210, 212 shown in FIG. 4).

Figure 12:
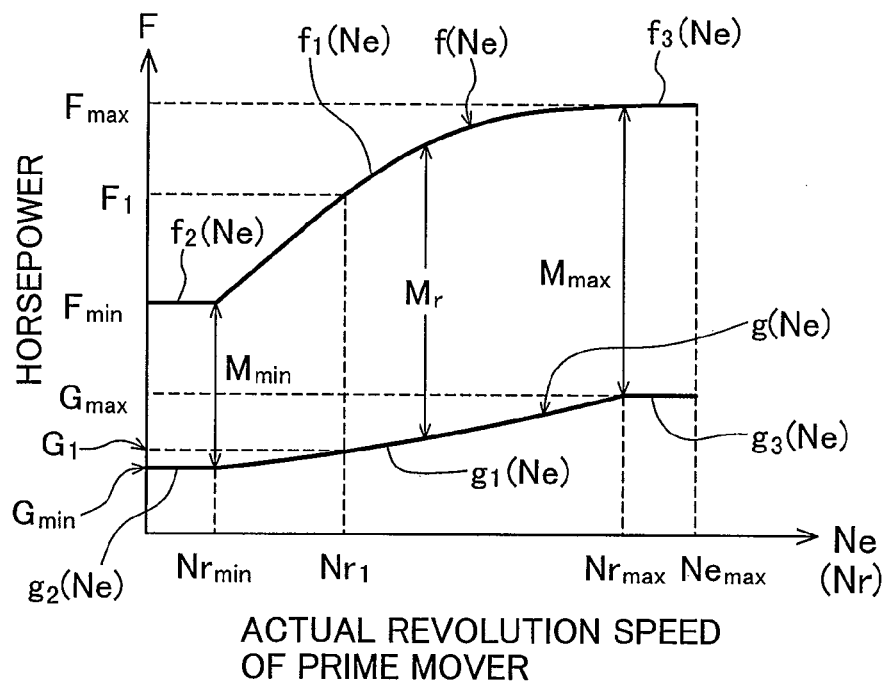
FIG. 12 is a chart illustrating both a function f (Ne) of the revolution speed of an prime mover and the output horsepower thereof, and a function g(Ne) of the revolution speed and other prime mover load loss horsepower.

Here, the functions f(Ne) and g(Ne) are created in the following manner. In FIG. 12, the function f(Ne) is used to determine the maximum output horsepower that can be generated by the prime mover 4. Here, the function f1(Ne), the function f2(Ne), and the function f3(Ne) are combined into the function f(Ne). The function f1(Ne) is equivalent to the function fr=f(Nr) of the relationship between the target revolution speed Nr and the output horsepower of the prime mover 4. If the actual revolution speed Ne of the prime mover 4 changes from Nrmin (for example, 750 rpm) up to Nrmax (for example, 2000 rpm), the maximum output horsepower f(Ne) which can be generated by the prime mover 4 changes from the minimum value Fmin up to the maximum value Fmax. This is a diagram illustrating a characteristic line that is specific to the prime mover 4. The function f2(Ne) is based on the assumption that the maximum output horsepower f(Ne) of the prime mover 4 is kept at a constant value of f2=Fmin within a range of $0 \leq Ne < Nrmin$. The function f3(Ne) is based on the assumption that the maximum output horsepower f(Ne) of the prime mover 4 is kept at a constant value of f3=Fmax within a range of $Nrmax < Ne \leq Nemax$.

The prime mover 4 drives not only the alternating-current generator 5 but also components including: a cooling fan (not illustrated) used for sending air to a radiator; an oil hydraulic pump for driving hydraulic equipment that is used to move a vessel of the dump truck up and down, and that is used to perform steering operation; and a second electric generator (not illustrated) for driving an electric fan (not illustrated) that is used to cool the alternating-current generator 5, the grid resistor 9, the electric motors 12R, 12L, and the control units 3, 7. In FIG. 1, these components are illustrated as the other prime mover loads 18. Horsepower values, which are assigned beforehand to drive the other prime mover loads 18, are expressed by g(Ne) shown in FIG. 12. The horsepower g(Ne) is set at values which are slightly larger than those of the horsepower actually consumed by the other prime mover loads 18 so that a sufficient margin of the horsepower g(Ne) is left. In this specification, this horsepower is called the loss horsepower.

As is the case with the function (Ne), the function g1(Ne), the function g2(Ne), and the function g3(Ne) are combined into the loss horsepower g(Ne). In the case of the function g1(Nr), if the actual revolution speed Ne of the prime mover 4 changes from Nrmin (for example, 750 rpm) up to Nrmax (for example, 2000 rpm), the loss horsepower g1(Ne) changes from the minimum value Gmin up to the maximum value Gmax. The function g2(Ne) is based on the assumption that the loss horsepower g(Ne) is kept at a constant value of g2=Gmin within a range of $0 \leq Ne < Nrmin$. The function g3(Ne) is based on the assumption that the loss horsepower g(Ne) is kept at a constant value of g3=Gmax within a range of $Nrmax < Ne \leq Nemax$.

In FIG. 12, Mr, which is the difference (f(Ne) g(Ne)) between f(Ne) and g(Ne), is the total effective available maximum horsepower for the electric motors 12R, 12L. In other words, Mr=(f(Ne)−g(Ne)) is the available maximum horsepower (an assigned horsepower value) for the electric motors 12R, 12L, which are used for traveling, out of the maximum output horsepower f(Ne) that can be generated by the prime mover 4.

In a step 111, the target motor horsepower Mr2 of one electric motor is determined from the maximum output horsepower f(Ne) of the prime mover and the loss horsepower g(Ne) assigned to the other prime mover loads 18, both of which have been calculated in the step 110 (blocks 214, 216 shown in FIG. 4).

$$Mr2=(f(Ne)-g(Ne))/2$$

This Mr2 is used as a limit value for the above-described fundamental target horsepower Mr1. With respect to the maximum value HFmax of the above-described function hF(P) used for traveling forward, $Mr2 \leq HFmax$.

In a step 113, the difference (revolution speed deviation) ΔN between the target revolution speed Nr of the prime mover 4 and the actual revolution speed Ne of the prime mover 4 is calculated (a block 220 shown in FIG. 4). To be more specific, ΔN=Ne−Nr In a step 114, a judgment is made as to whether or not the current target revolution speed Nr is equivalent to the maximum revolution speed Nrmax. If it is judged that the target revolution speed Nr is set at the maximum revolution speed Nrmax (Nr=Nrmax), the process proceeds to a step 115 where with reference to a data map stored in the memory, which expresses the revolution speed deviation ΔN by a function S(ΔN) shown in FIG. 13, a horsepower coefficient Kp corresponding to the instantaneous revolution speed deviation ΔN is calculated (blocks 222, 224 shown in FIG. 4).

$$Kp=S(\Delta N)$$

Figure 13:
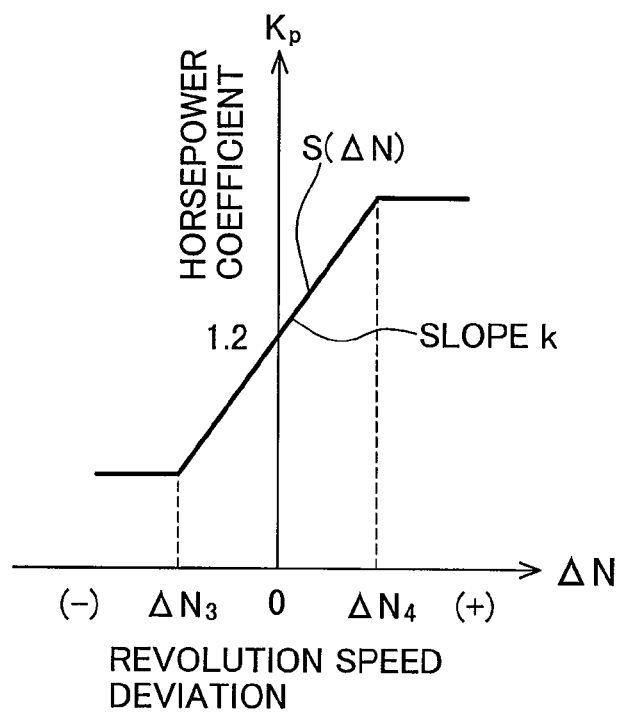
FIG. 13 is a chart illustrating a function Kp=S(ΔN) of a revolution speed deviation and a horsepower coefficient.

Here, in FIG. 13, the relationship between the revolution speed deviation ΔN and the horsepower coefficient Kp is set so that the horsepower coefficient Kp increases and decreases at a constant ratio (a slope coefficient k of a straight line S(ΔN) shown in FIG. 13) within a range of $\Delta N3 \leq \Delta N \leq \Delta N4$ including ΔN=0 in response to the increase and decrease of the revolution speed deviation ΔN, and that the horsepower coefficient Kp is kept constant within a range of ΔN<ΔN3 or ΔN>ΔN4. ΔN=0 is a state in which the output of the prime mover 4 and the output consumed by the electric motors 12R, 12L are kept in balance; ΔN<0 is a state in which the output of the prime mover is not sufficient; and ΔN>0 is a state in which the output of the prime mover is sufficient. ΔN3 is a value that falls within the range of ΔN<0, whereas ΔN4 is a value that falls within the range of ΔN>0. As an example, if ΔN=0, Kp=1.2; if ΔN=ΔN3, Kp=1; and if ΔN=ΔN4, Kp=1.4. In this case, ΔN3=−50 rpm; and ΔN4=50 rpm. To be more specific, if the revolution speed deviation ΔN changes within a range of ±50 rpm, the horsepower coefficient Kp changes within a range of 1.0 to 1.4. If ΔN<−50 rpm, the horsepower coefficient Kp is kept constant at Kp=1.0. If ΔN>50 rpm, the horsepower coefficient Kp is kept constant at Kp=1.4. It is desirable that a value of the horsepower coefficient Kp at a point at which ΔN=0 be a given value within a range of 1.1 to 1.3. In addition, it is desirable that if ΔN=ΔN3, ΔN4, a value of the horsepower coefficient Kp be a given value within a range of ±30 to ±100. It is desirable that a range of change in horsepower coefficient Kp at a point at which ΔN3<ΔN<ΔN4 be from 10 to 20% of the horsepower coefficient Kp at a point at which ΔN=0.

If the target revolution speed Nr is lower than the maximum revolution speed Nrmax (if Nr<Nrmax) in the step 114, the horsepower coefficient Kp is set at Kp=1 in a step 116 (blocks 223, 224 shown in FIG. 4).

In a step 117, the target motor horsepower Mr2, which has been calculated in the step 111, is multiplied by Kp to determine the target motor horsepower Mr3 (block 226 shown in FIG. 4). To be more specific, Mr3=Kp×Mr2

This Mr2 becomes a final limit value for the above-described target motor horsepower Mr3, and for the fundamental target motor horsepower Mr1 that has been calculated in the steps 105, 106, 107. In a step 118, in comparison with the fundamental target motor horsepower Mr1, a smaller value is output as the target motor horsepower Mr (block 228 shown in FIG. 4).

$$Mr=\min(Mr1,Mr3)$$

To be more specific, in the step 118 (block 228 shown in FIG. 4), the target motor horsepower Mr3 is used as a limit value for the target motor horsepower Mr1; and a limit is placed so that the target motor horsepower Mr does not exceed Mr3 that is a final targeted value given to the electric motors 12R, 12L. This target motor horsepower Mr corresponds to the instructed horsepower MR, ML shown in FIG. 1 (MR=ML=Mr).

In steps 119, 120, from the target motor horsepower Mr, and from the rotational speed ωR, ωL of the electric motors 12R, 12L, the first target motor torque Tr1R, Tr1L is calculated respectively (blocks 230, 232 shown in FIG. 4). To be more specific, $$Tr1R=K1\times Mr/\omega R$$

$$Tr1L=K1\times Mr/\omega L$$

K1: Constant used to calculate the torque from the horsepower and the rotational speed.

Figure 14:
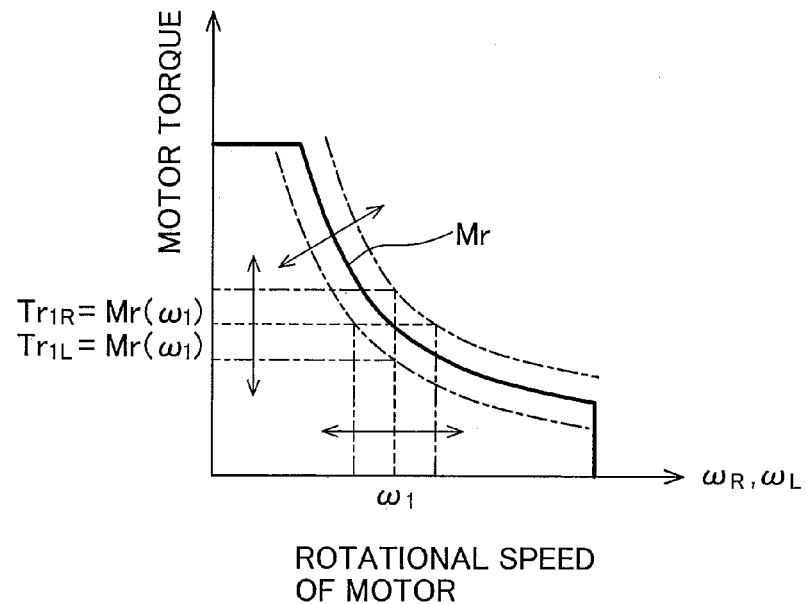
FIG. 14 is a chart illustrating the relationship among the target motor horsepower Mr, the motor rotational speed ωR, ωL, and the target motor torque Tr1R, Tr1L.

FIG. 14 is a chart illustrating the relationship among the target motor horsepower Mr, the rotational speed ωR, ωL of the electric motors 12R, 12L, and the target motor torque Tr1R, Tr1L. If the target motor horsepower Mr is determined, the target motor torque Tr1R, Tr1L in response to the instantaneous motor rotational speed ωR, ωL is determined respectively. For example, when the motor rotational speed ωR, ωL is ω1, the target motor torque becomes Tr1R=Mr(ω1), Tr1L=Mr(ω1) respectively. Moreover, for example, when the dump truck comes to an upward slope, the load torque of the electric motors 12R, 12L increases, and accordingly the motor rotational speed ωR, ωL decreases, with the result that the target motor torque Tr1R, Tr1L increases in response to the increase in load torque respectively. In contrast with this, when the load torque of the electric motors 12R, 12L decreases, the target motor torque Tr1R, Tr1L decreases respectively. On the other hand, if the target motor horsepower Mr is increased, the target motor torque Tr1R, Tr1L increases in response to the increase in target motor horsepower Mr respectively. If the instantaneous motor load torque is constant, the motor rotational speed ωR, ωL increases respectively. In contrast with this, if the target motor horsepower is decreased in a state in which the motor load torque is kept constant, the motor rotational speed ωR, ωL decreases respectively.

Figure 15:
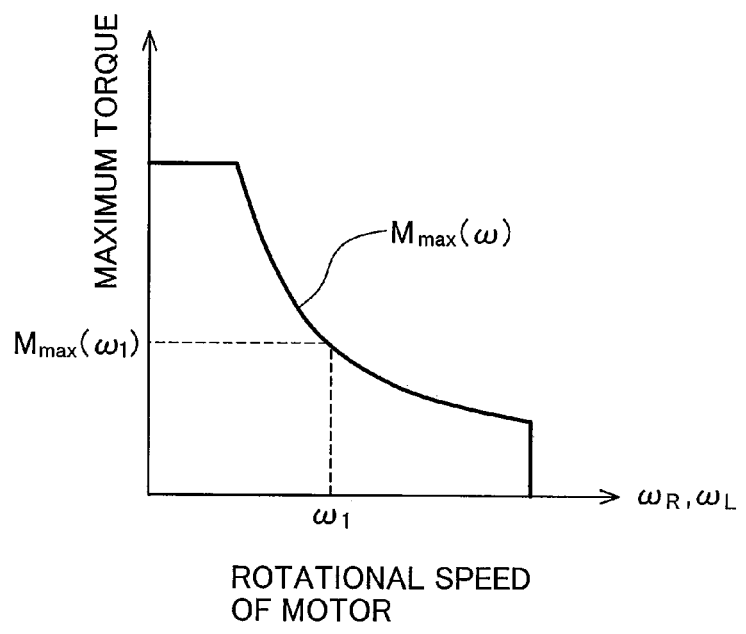
FIG. 15 is a chart illustrating a function Mmax(ω) of the rotation speed of motors and the maximum output torque of the motors.

In a step 121, with reference to a data map expressed in a function Mmax(ω) shown in FIG. 15, upper limit Mmax (ωR), Mmax(ωL) of motor torque instructions corresponding to the rotational speed ωR, ωL of the electric motors 12R, 12L are determined respectively (blocks 234, 236 shown in FIG. 4). For example, when the motor rotational speed ωR, ωL is ω1, the upper limit Mmax(ωR), Mmax(ωL) of the motor torque instructions are Mmax(ω1) respectively. The function Mmax(ω) is a data map of the rotational speed of each motor and the maximum output torque of the each motor. The function Mmax(ω) is predetermined on the basis of the following: the maximum value of current, which the inverter 73R, 73L can supply to the electric motors 12R, 12L respectively; an output limit of a driver element such as IGBT or GTO included in the inverters 73R, 73L; and the strength of each motor axis.

In a step 122, the upper limit Mmax(ωR), Mmax(ωL) of the motor torque, which have been determined in the step 121, are compared with the first target motor torque Tr1R, Tr1L determined in the step 120, and then the torque whose value is smaller is used as the second target motor torque TrR, TrL respectively (blocks 238, 240 shown in FIG. 4).

To be more specific, $TrR = \min(Mmax(\omega R), Tr1R)$ $TrL = \min(Mmax(\omega L), Tr1L)$ Processing performed in the steps 101 through 118 (the blocks 200 through 228 shown in FIG. 4) is processing performed by the total control unit 3. Processing performed in the step 119 through 122 (the blocks 230, 232, 234, 236, 238, 240 shown in FIG. 4) is processing performed by the torque instruction operation units 71R, 71L of the inverter control unit 7.

In a step 123, the motor control operation units 72R, 72L included in the inverter control unit 7 control the inverters 73R, 73L in response to the target motor torque TrR, TrL so that the torque of the electric motors 12R, 12L is controlled respectively.

In the above description, a processing function executed in the steps 101 through 103 (the blocks 200, 202 shown in FIG. 4) forms target revolution speed calculation means for calculating the target revolution speed Nr in response to the operation amount of the accelerator pedal 1. A processing function executed in the steps 104 through 123 (the blocks 204 through 240), and the motor control operation units 72R, 72L of the inverter control unit 7, form motor control means for controlling the inverters 73R, 73L in response to the operation amount of the accelerator pedal 1 so as to control the electric motors 12R, 12L respectively. The electronic governor 4a controls the fuel injection amount for the prime mover 4 on the basis of the target revolution speed Nr. The electronic governor 4a is so configured that when the target revolution speed Nr is set at least at the maximum revolution Nrmax, the control of the fuel injection amount becomes the droop control.

In addition, a processing function executed in the steps 105, 106, 107 (the blocks 204, 206, 208 shown in FIG. 4) forms first target output horsepower calculation means for calculating target motor horsepower Mr1 (first target motor horsepower) corresponding to the operation amount p of the accelerator pedal 1. A processing function executed in the steps 113 through 117 (the blocks 220 through 226 shown in FIG. 4) forms speed sensing control means for modifying the available maximum horsepower (f(Ne)−g(Ne)) for the electric motors for traveling 12R, 12L such that the available maximum horsepower increases when the actual revolution speed Ne of the prime mover is higher than the target revolution speed Nr, and the increased maximum horsepower decreases with the decrease in the actual revolution speed of the prime mover 4. A processing function executed in the steps 110 through 117 (the blocks 210 through 226 shown in FIG. 4) includes the speed sensing control means, and forms second target motor horsepower calculation means for determining, as second target motor horsepower Mr3, the available maximum horsepower that has been modified by the speed sensing control means. Moreover, a processing function executed in the step 118 (the block 228 shown in FIG. 4) forms target motor horsepower limiting means for limiting the first target motor horsepower Mr1 so that the first target motor horsepower Mr1 does not exceed the second target motor horsepower Mr3, thereby to generate the target motor horsepower Mr (the second target motor horsepower). A processing function executed in the steps 119 through 123 (the blocks 230 through 240 shown in FIG. 4), and the motor control operation units 72R, 72L of the inverter control unit 7, form inverter control means for determining the first target motor torque Tr1R, Tr1L of each of the two electric motors 12R, 12L on the basis of the third target motor horsepower Mr so as to control the inverters 73R, 73L respectively.

The speed sensing control means (the blocks 220 through 226 shown in FIG. 4) functions when the target revolution speed Nr of the prime mover 4 is set at least at the maximum revolution speed, and does not function in all other cases.

In addition, a processing function executed in the steps 110, 111 (the blocks 210, 212, 214 shown in FIG. 4) forms maximum horsepower calculation means for subtracting the loss horsepower g(Ne), which is required to drive the other prime mover loads 18 other than the alternating-current generator 5, from the maximum output horsepower f(Ne) that can be output by the prime mover 4, and thereby for determining the available maximum horsepower (f(Ne)−g(Ne)) for the electric motors 12R, 12L for traveling.

In this specification, the control by the speed sensing control means (the steps 113 through 117, the blocks 220 through 226 shown in FIG. 4) is referred to as "speed sensing control"; and the control by the maximum horsepower calculation means (the steps 110, 111, the blocks 210, 212, 214 shown in FIG. 4), and by the target motor horsepower limiting means (the step 118, the block 228 shown in FIG. 4), is referred to as "total horsepower control". Moreover, the control into which the speed sensing control and the total horsepower control are combined is referred to as "speed sensing total horsepower control".

Next, operation of this embodiment will be described. The operation will be described with reference to a functional block diagram shown in FIG. 4.

1. High-Speed Traveling

With the intention of moving a dump truck forward, if the accelerator pedal 1 is pressed down up to a position at which nearly the maximum horsepower is acquired, and at which the operation amount of the accelerator pedal 1 exceeds Px (refer to FIG. 8), Fmax is calculated as the target horsepower Fr of the prime mover 4 in a block 200 shown in FIG. 4, and Nrmax is calculated as the target revolution speed Nr (Nr=Nrmax) in the block 202. On the receipt of an instruction of the target revolution speed Nrmax, the electronic governor 4a controls the fuel injection amount so that the prime mover 4 revolves at the target revolution speed Nrmax. As described above, if Nr Nrmax, the electronic governor 4a is kept under the droop control.

On the electric motor side, F/R becomes equivalent to 1 (F/R=1) in the block 204 shown in FIG. 4, and accordingly the processing function in the block 206 is selected. In the block 206, the target motor horsepower HFmax corresponding to nearly the maximum operation amount of the accelerator pedal is calculated as the fundamental target horsepower Mr1 of the electric motors 12R, 12L.

In the blocks 210, 212 shown in FIG. 4, the target revolution speed Nr of the prime mover 4 is determined with reference to a data map of the functions f(Ne), g(Ne) shown in FIG. 12 to calculate values of f(Ne), g(Ne). Then, in the block 214, 216, from the values of g(Ne), f(Ne), the target motor horsepower Mr2 (the available maximum horsepower for one electric motor) of one electric motor is determined by use of Mr2=(f(Ne)−g(Ne))/2.

In the block 220 shown in FIG. 4, a revolution speed deviation ΔN, which is a deviation of the actual revolution speed Ne from the target revolution speed Nr of the prime mover 4, is determined. In the block 222, the horsepower coefficient Kp corresponding to the revolution speed deviation ΔN is calculated by use of the equation of Kp=S(ΔN). In the block 224, because Nr=Nrmax, the horsepower coefficient KP is selected. In the block 226, the target motor horsepower Mr2 is multiplied by the horsepower coefficient Kp to calculate the target motor horsepower Mr3.

In the block 228 shown in FIG. 4, the smaller value is selected from values of the target motor horsepower Mr1 and the target motor horsepower Mr3 to generate the target motor horsepower Mr. Moreover, in the blocks 230 through 240, the target motor torque TrR, TrL of the right and left electric motors 12R, 12L is calculated respectively. The target motor torque TrR, TrL is given as the instructed horsepower of the electric motors 12R, 12L to the motor control operation units 72R, 72L included in the inverter control unit 7 respectively. Then, the inverters 73R, 73L are controlled according to the target motor torque TrR, TrL so that the torque of the electric motors 12R, 12L is controlled respectively.

Thus, in a state in which Nrmax is set as a result of pressing down the accelerator pedal 1 nearly to the maximum extent, the speed sensing total horsepower control is performed in the blocks 220 through 226. The speed sensing total horsepower control makes it possible to make full use of the output horsepower up to the output limit of the prime mover 4, and thereby to effectively utilize the prime mover horsepower on the motor side (described later).

2. Low-Speed Traveling

If the extent to which the accelerator pedal 1 is pressed down is small, the target horsepower Fr whose value is smaller than Frmax is calculated in the block 200 shown in FIG. 4. Then, the target revolution speed Nr whose value is lower than Nrmax is calculated in the block 202 (Nr<Nrmax) so that the fuel injection amount of the prime mover 4 is controlled in response to the target revolution speed Nr.

Because Nr<Nrmax on the electric motor side, Kp=1, which is set in the block 223, is selected in the block 222 so that the speed sensing control is disabled. In the block 226, the target motor horsepower Mr3 is calculated (Mr3=Mr2). In the block 228, the first target motor horsepower is limited not so as to exceed the target motor horsepower Mr3 thereby to determine the target motor horsepower Mr. In the blocks 228 through 240, the torque of the electric motors 12R, 12L is controlled in response to the target motor torque TrR, TrL that has been determined by the target motor horsepower Mr respectively.

Thus, if Nr<Nrmax, the processing (the speed sensing control) described in the blocks 220 through 226, which uses the revolution speed deviation ΔN, is disabled. Accordingly, the total horsepower control which does not include the speed sensing control is performed.

3. Backward Traveling

When the accelerator pedal 1 is pressed down to cause the dump truck to move backward, the target motor horsepower H for traveling backward is calculated in the block 208. In this case, the maximum value HRmax of the target motor horsepower H in the function hR(P) used for traveling backward is set at a slightly smaller value. Accordingly, in the block 228 shown in FIG. 4, the target motor horsepower Mr1 is selected, and then the torque of the electric motors 12R, 12L is controlled without being limited by the target motor horsepower Mr3.

Next, effects of the speed sensing total horsepower control according to this embodiment will be described with reference to diagrams.

Figure 16:
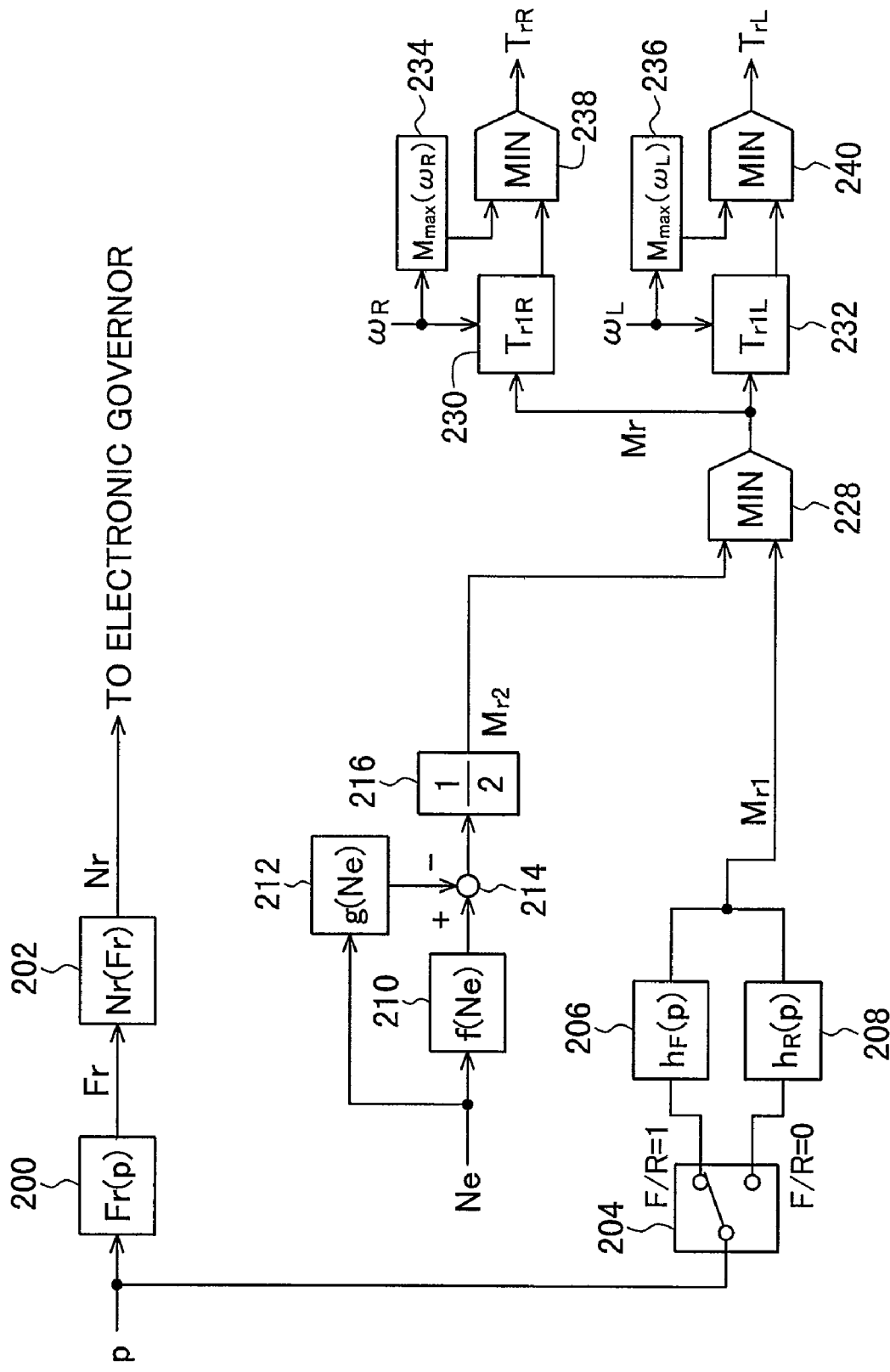
FIG. 16 is a functional block diagram illustrating, as a comparative example, a drive system used in a case where the speed sensing total horsepower control is not performed, the functional block diagram being similar to FIG. 4.

FIG. 16 is a functional block diagram illustrating, as a comparative example, a drive system used in a case where the total horsepower control which does not include the speed sensing control is performed, the functional block diagram being similar to FIG. 4. Similar reference numerals are used in FIG. 16 to designate parts that are similar to those shown in FIG. 4. Because the speed sensing control is not performed in the comparative example shown in FIG. 16, the blocks 220 through 226 shown in FIG. 4 (the steps 112 through 117 shown in FIG. 6) are not included. Therefore, the target motor horsepower Mr2, which has been calculated in the blocks 210 through 216, is compared with the target motor horsepower Mr1 just as it is in the block 228.

Figure 17:
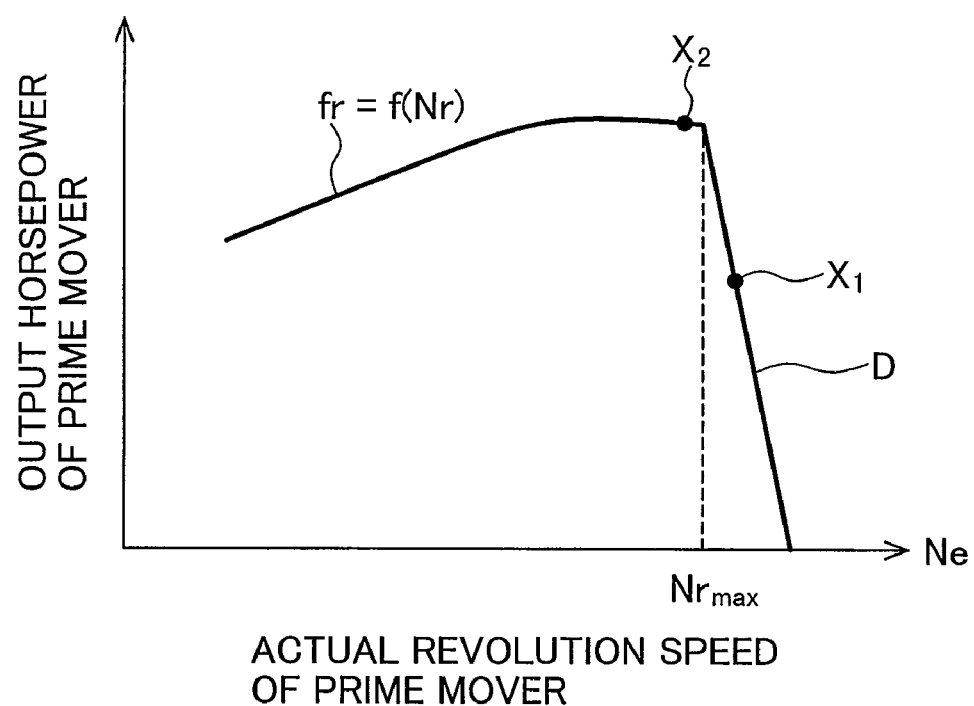
FIG. 17 is a horsepower characteristic chart illustrating operating characteristics of a prime mover when Nr=Nrmax.

FIG. 17 is a diagram illustrating operating characteristics of the prime mover 4 when Nr=Nrmax. In the figure, fr(Nr) is equivalent to the function f1(Ne) of the maximum output horsepower that can be output by the prime mover 4, the function f1(Ne) being shown in FIG. 12. The straight line D indicates horsepower characteristics corresponding to the straight line R1 of the droop control shown in a diagram illustrating prime mover output torque characteristics in FIG. 2.

As described above, when Nr=Nrmax, in the blocks 210, 212 shown in FIG. 4, the actual revolution speed Ne of the prime mover 4 is determined with reference to the functions f(Ne), g(Ne) shown in FIG. 12 to calculate values of f(Ne), g(Ne) corresponding to the maximum revolution speed Nrmax. In the blocks 214, 216, from the values of g(Ne), f(Ne), the target motor horsepower Mr2 of one electric motor (the available maximum horsepower for one electric motor) is determined by use of the equation of Mr2=(f(Ne)−g(Ne))/2.

Here, the function f(Ne) expresses the maximum output horsepower that can be generated by the prime mover 4; and the function g(Ne) expresses a value of the horsepower (loss horsepower) that is preassigned to drive the other prime mover loads 18. This loss horsepower is determined on the basis of an estimated value of the horsepower to be consumed by the other prime mover loads 18. However, the actual consumed horsepower of the other prime mover loads 18 is a value that changes in response to operating situations. In addition, the change ranges from 10 to 20% of the maximum output horsepower of the prime mover 4, which makes it difficult to estimate the actual consumed horsepower. Moreover, a fan for cooling engine oil automatically repeats operation and stop, and the horsepower consumed by the fan becomes about from 5 to 10% of the output horsepower of the prime mover 4. Therefore, if the loss horsepower of the other prime mover loads 8 is set at a certain estimated value, the actual consumed horsepower may become larger than the estimated value, and may also become smaller than the estimated value. If the actual consumed horsepower becomes larger than the estimated value, there is a possibility that the prime mover 4 will stall. For this reason, it is necessary to set the loss horsepower g(Ne) at a value that is larger than that of the actual consumed horsepower with a sufficient margin of the loss horsepower g(Ne) being left. For example, on the assumptions that when Nr=Nrmax, f(Ne)=1500 kW, and that an estimated value of the loss horsepower is about 200 kW, the loss horsepower g(Ne) is set at about 300 kW. In this case, the target motor horsepower Mr2 of one electric motor is calculated as follows: Mr2=(f(Ne)−g(Ne))×½=(1500 kW−300 kW)×½=1200 kW×½=600 kW.

On the other hand, if the loss horsepower g(Ne) is set at a larger value in this manner with the sufficient margin of the loss horsepower g(Ne) being left, the prime mover 4 still has enough horsepower in the comparative example shown in FIG. 12. However, it is not possible to effectively utilize the horsepower in question as the output of the electric motors 12R, 12L. For example, if the above-described loss horsepower g(Ne) is equivalent to 300 kW, the actual consumed horsepower is 200 kW, which is the same as the estimated value. Accordingly, the total consumed horsepower which includes the electric motors is calculated as follows: 200 kW+(600×2) kW=1400 kW. As a result, the useless horsepower which cannot be effectively used is 100 kW. FIG. 17 is a chart that indicates, with a X1 point, an operating point of the prime mover 4 during traveling in a state in which the loss horsepower g(Ne) is set in this manner.

In this embodiment, because the total horsepower control which includes the speed sensing control is performed for such a comparative example, it is possible to make full use of the output horsepower up to the output limit of the prime mover 4, and thereby to effectively utilize the prime mover horsepower on the motor side.

To be more specific, in this embodiment, if the prime mover 4 leaves a sufficient margin for output, ΔN>0 as a result of the droop control. Accordingly, the target motor horsepower Mr2 is calculated by the speed sensing control in the blocks 220 through 226 so that the target motor horsepower Mr2 has a larger value. This value is used as the third target horsepower Mr2. Therefore, during traveling at Nr=Nrmax, it is possible to make full use of the horsepower up to the output limit of the prime mover 4, and to drive the electric motors 12R, 12L. In the above example, an operating point of the prime mover 4 is located at X1 shown in FIG. 17. On the assumption that the horsepower coefficient Kp calculated by ΔN in the block 222 is Kp=1.3, the third target motor output horsepower Mr3 increases from 600 kW, which is the same as the target motor horsepower Mr2, to 600 kW×1.3=780 kW. As a result, the operating point of the prime mover 4 moves from X1 shown in FIG. 17 to the overload side where ΔN<0. For example, the operating point of the prime mover 4 balances at a point X2 at which the revolution speed is lower than Nrmax at ΔN=0 by about from −10 to −30 rpm. At the point X2, if the horsepower coefficient Kp achieved in the block 222 is, for example, 1.1, the target motor horsepower Mr3 is calculated as follows: 600×1.1=660 kW. Accordingly, the total consumed horsepower which includes the other prime mover loads 18 is calculated as follows: 200 kW+(660×2) kW≅1500 kW. Thus, it is possible to effectively use the output horsepower of the prime mover 4 up to an output limit of the prime mover 4 without waste.

On the other hand, while the dump track travels as described above, if the consumed horsepower of the other prime mover loads 8 increases for some reason or other (for example, due to a change in temperature), which causes the operating point X2 shown in FIG. 17 to be further moved to the left side of FIG. 17, the revolution speed deviation ΔN further decreases, causing the horsepower coefficient Kp calculated in the block 222 to decrease. As a result, the target motor horsepower Mr3 also decreases, which limits the target motor horsepower Mr1. For example, in the above example, if ΔN decreases, and Kp=1.0 is then calculated in the block 222, the third target motor output horsepower Mr3 decreases from 660 kW to 600 kW that is the same as the second target motor output horsepower Mr2. As a result, the operating point of the prime mover 4 returns to the side of ΔN=0 again, and balances at a point at which the sum of the consumed horsepower of the prime mover load 8 and the consumed horsepower (the third target motor output horsepower Mr2) of the electric motors 12R, 12L coincides with the maximum output horsepower of the prime mover 4 (in the above example, 1500 kW). This makes it possible to prevent the prime mover 4 from stalling.

As described above, according to this embodiment, if the consumed horsepower of the other prime mover loads 8 is small at Nr=Nrmax, the limit value of the target horsepower of each of the electric motors 12R, 12L (the target motor horsepower Mr3) is increased to make full use of the horsepower up to the output limit of the prime mover 4 so that each of the electric motors 12R, 12L is driven. In addition, if the consumed horsepower of the other prime mover loads 8 increases, the limit value of the target horsepower of each of the electric motors 12R, 12L (the target motor horsepower Mr3) is decreased to reduce the consumed horsepower of each of the electric motors 12R, 12L. As a result, it is possible to avoid the overload of the prime mover 4, and to prevent the prime mover 4 from stalling.

On the other hand, if the accelerator pedal is not operated to the maximum extent, with the result that the target revolution speed Nr of the prime mover 4 is smaller than the maximum revolution speed Nrmax (Nr<Nrmax), the speed sensing control to be performed by the blocks 220 through 226 as described above may cause a malfunction. For example, in a state in which the accelerator pedal 1 is operated to a half extent, if the dump truck comes to an upward slope during traveling along a flat road at Nr<Nrmax, the traveling speed decreases. Accordingly, in order to keep the traveling speed constant, an operator increases the extent to which the operator presses down on the accelerator pedal 1. In this case, a case where the speed sensing control is performed by the blocks 220 through 226 shown in FIG. 4 is considered. While the dump truck travels along the flat road, the prime mover 4 leaves a sufficient margin for output, and accordingly ΔN>0. As soon as the operator increases the extent to which the operator presses down on the accelerator pedal 1, the target motor horsepower Mr1 increases. This causes the loads of the prime mover 4 to increase, and accordingly ΔN<0. As a result, the horsepower coefficient Kp calculated in the block 222 decreases, and the target motor horsepower Mr3 also decreases. Therefore, the target motor horsepower Mr1 is limited by the target motor horsepower Mr3. Even if the accelerator pedal 1 is pressed down, the target torque Mr of the electric motors 12R, 12L decreases, which causes the traveling speed to decrease.

According to this embodiment, if the target revolution speed Nr of the prime mover 4 is smaller than the maximum revolution speed Nrmax (more specifically, if Nr<Nrmax), the horsepower coefficient Kp is switched to Kp=1 in the blocks 223, 224 shown in FIG. 4 so that the speed sensing control is disabled. As a result, the malfunction as described above does not occur; and smooth acceleration in response to the operation of pressing down the accelerator pedal 1 becomes possible.

Other effects of this embodiment will be described as below.

According to this embodiment, in the blocks 206, 208, the blocks 210 through 226, and the block 228, which are shown in FIG. 3, not the target torque but the target horsepower Mr1, Mr2, Mr3 is determined as an instruction value of the electric motors 12R, 12L. Then, in the blocks 230, 232, the target horsepower Mr3 is divided by the instantaneous motor rotational speed to calculate the first target motor torque Tr1R, Tr1L. Moreover, the target motor torque is compared with a value acquired from a function of the maximum torque, which is specific to the inverter, and the motors, so that a smaller value is controlled as the final target torque TrR, TrL.

Here, it is thought that not the target motor horsepower but the target motor torque is calculated as a value to be directly calculated from the operation amount p of the accelerator pedal 1. However, in this case, when the operation amount of the accelerator pedal 1 is small, all of the target revolution speed of the prime mover 4, the horsepower of the electric motors 12R, 12L, and the torque decrease. Therefore, in situations in which the operator wants to increase the torque with the operation amount of the accelerator pedal being decreased so that the horsepower to be applied to the electric motors 12R, 12L is decreased, the operator cannot properly operate the accelerator pedal. For example, at the time of starting traveling along an upward slope, only pressing down the accelerator pedal 1 to a small extent results in insufficient torque. Therefore, the operator is required to press down on the accelerator pedal 1 to a larger extent. However, while the operator is at a loss, the dump truck may also move backward because of the self-weight of the dump truck, which is dangerous.

According to this embodiment, in the blocks 206 through 228, the target horsepower Mr is determined as an instructed value of the electric motors 12R, 12L. After that, the target motor torque is calculated with reference to the instantaneous rotational speed of the electric motors 12R, 12L. so as to control the electric motors 12r, 12L. As a result, if the rotational speed of each of the electric motors 12R, 12L is low, the operation amount of the accelerator pedal 1 is small. Accordingly, even if the horsepower applied to each of the electric motors 12R, 12L is small, it is possible to increase the output torque. Therefore, such a malfunction that the dump truck moves backward at the time of starting traveling along the upward slope does not occur.

In addition, because the motor output horsepower corresponds to the operation amount p of the accelerator pedal 1, excellent operational feeling can be achieved.

Thus, according to this embodiment, in a state in which the operation amount of the accelerator pedal 1 is small, and in which although the horsepower applied to each of the electric motors 12R, 12L is small, the traveling speed is slow, and the rotational speed of the motors is low, it is possible to increase the torque to be applied to the electric motors 12R, 12L up to the very upper limit. Accordingly, the dump truck does not move backward when the dump truck starts traveling along the upward slope. As a result, the operational feeling is improved, and the higher security is ensured.

In addition, according to this embodiment, in the blocks 200, 202 shown in FIG. 4, the target revolution speed Nr of the prime mover 4 is not directly determined from the operation amount p of the accelerator pedal 1. First of all, the target horsepower Fr of the prime mover 4 is calculated by the function Fr(p) (block 200). Then, by use of the target horsepower Fr, the target revolution speed Nr is calculated by the function Nr(Fr) that is an inverse function of fr(Nr) shown in FIG. 12 (block 202). This makes it possible to modify the nonlinearity of the horsepower characteristics of the prime mover 4.

Up to this point, the embodiments of the present invention have been described. However, the present invention can be changed in various ways within the spirit and scope of the present invention. Representative examples thereof will be described as below.

1. In the embodiments described above, when the speed sensing control of the total horsepower control is performed, the horsepower coefficient Kp is determined as a horsepower modification value in the block 222, and then the horsepower coefficient Kp is multiplied by the target motor horsepower Mr2 to determine the target motor horsepower Mr3 in the block 226. However, it may also be so configured that a function of a revolution speed deviation ΔN and a function of a horsepower modification value ΔM are used as the functions in the block 222 so as to determine the horsepower modification value ΔM corresponding to the instantaneous revolution speed deviation ΔN, and that this horsepower modification value ΔM is added to the target motor horsepower Mr2 to determine the target motor horsepower Mr3.

2. In the embodiments described above, in the blocks 210, 212 shown in FIG. 4, on the assumption that the maximum output horsepower and the loss horsepower are the functions f(Ne), g(Ne) of the actual revolution speed Ne of the prime mover 4 respectively, the maximum output horsepower and the loss horsepower are determined from the actual revolution speed Ne of the prime mover 4. However, because usually the accelerator pedal is not rapidly operated, Ne is roughly equivalent to Nr (Ne=Nr). Therefore, on the assumption that the maximum output horsepower and the loss horsepower are functions f(Nr), g(Nr) of the target revolution speed Nr of the prime mover 4 respectively, the maximum output horsepower and the loss horsepower may also be determined from the target revolution speed Nr of the prime mover 4.

3. In the embodiments described above, in the block 224, the speed sensing control is enabled or disabled on the basis of whether or not the target revolution speed Nr of the prime mover 4 is equivalent to Nrmax (Nr=Nrmax). However, the revolution speed, which is used as the criterion of judgment, is not limited to one point (Nrmax). The revolution speed may also approximately range from 0 through 50 rpm. In addition, instead of the target revolution speed Nr, the operation amount p of the accelerator pedal 1 may also be used as a judgment parameter. If the judgment is made by the operation amount p of the accelerator pedal 1, for example, if p≧90%, the speed sensing control is enabled, whereas if p<90%, the speed sensing control is disable. As a result, it is possible to obtain effects that are similar to those obtained in the case where the speed sensing control is enabled or disabled on the basis of whether or not the target revolution speed Nr is equivalent to Nrmax (Nr=Nrmax).

4. In the embodiments described above, the loss horsepower g(Ne) of the other prime mover loads 8 is set at a value with a sufficient margin for an estimated value being left. However, the loss horsepower g(Ne) of the other prime mover loads 8 may also be set at a value, which is the same as, or approximately the same as, the estimated value, without leaving a sufficient margin for the estimated value. In this case, by configuring the function S(ΔN) in the block 222 so that when the revolution speed deviation ΔN=0 a value of the horsepower coefficient Kp becomes about 1 (when ΔN=0, Kp≅1), if the consumed horsepower of the other prime mover loads 8 is smaller than the estimated value (the loss horsepower g(Ne)), with the result that ΔN>0, the target motor horsepower Mr3 calculated in the block 226 exceeds the loss horsepower g(Ne) as a set value, and accordingly the prime mover horsepower can be effectively used on the motor side. On the other hand, if the consumed horsepower of the other prime mover loads 8 exceeds the estimated value (the loss horsepower g(Ne)), with the result that ΔN<0, the target motor horsepower Mr3 calculated in the block 226 as the result becomes lower than the loss horsepower g(Ne) as the set value, which makes it possible to prevent the prime mover 4 from stalling due to the overload of the prime mover 4. Incidentally, in this case, if the speed sensing control is not performed when Ne<Nrmax, it is necessary to set the horsepower coefficient Kp in the block 223 at a value having a sufficient margin (Kp is set at about 0.9) so that the consumed horsepower of the electric motors 12R, 12L for traveling does not excessively increase.

5. In the embodiments described above, in the blocks 210 through 226, in order to determine the target motor horsepower Mr3 used to perform the speed sensing total horsepower control, the target motor horsepower Mr3 is calculated by the following order: in the blocks 210, 212, separately determining the maximum output horsepower f(Ne) and the loss horsepower g(Ne); in the block 214, determining the difference between the maximum output horsepower f(Ne) and the loss horsepower g(Ne); in the block 216, multiplying the difference by ½ to determine the target motor horsepower Mr2; and in the block 226, multiplying the target motor horsepower Mr2 by the horsepower coefficient Kp. However, this is merely an example. The order of calculation, and how to calculate Mr3, are not limited to the example so long as Mr3 whose value is the same is determined as a result of the calculation. For example, it may also be so configured that in the blocks 210, 212, the maximum output horsepower f(Ne) and the loss horsepower g(Ne) are determined by use of each of the functions f(Ne), g(Ne), and that in the block 214, instead of determining the difference between the maximum output horsepower f(Ne) and the loss horsepower g(Ne), a function corresponding to f(Ne)−g(Ne) is provided beforehand so as to determine a value that is equivalent to the difference in question by one processing step. Moreover, in the blocks 216, 226, the difference f(Ne)−g(Ne) between the maximum output horsepower f(Ne) and the loss horsepower g(Ne) is determined before the difference is multiplied by ½, and by the horsepower coefficient Kp. However, the difference may also be multiplied by ½, and by the horsepower coefficient Kp, before the calculation in the block 214. In another case, the multiplication may also be performed with the order of either ½ or the horsepower coefficient Kp being reversed.

6. Although the electric motors 12R, 12L are induction motors, they may also be synchronous motors.

7. In the embodiment described above, a function, which differs from the functions hF(P), hR(P) for determining the target motor horsepower in the blocks 206, 208, is used as the function Fr(P) used in the block 200. However, a function, which is the same as the functions hF(P), hR(P) for determining the target motor horsepower in the blocks 206, 208, may also be used. In this case, because the prime mover 4 is driven so that the prime mover 4 outputs only the horsepower required for the electric motors 12R, 12L, it becomes possible to achieve the optimum prime mover control without waste. Incidentally, in this case, it is desirable that the target horsepower of the prime mover 4 be corrected so that the revolution speed becomes slightly higher with the target motor horsepower+α being used as a target value.

The invention claimed is:

1. A drive system for an electrically driven dump truck comprising:
   a prime mover;
   an electronic governor for controlling the revolution speed and torque of the prime mover;
   an alternating-current generator driven by the prime mover;
   prime mover loads other than the alternating-current generator, driven by the prime mover;
   at least two electric motors for traveling, each of which is driven by the electric power supplied by the alternating-current generator; and
   at least two inverters, each of which is connected to the alternating-current generator, and each of which controls each of the electric motors,
   wherein the drive system comprises target revolution speed calculation means for calculating the target revolution speed corresponding to the operation amount of an accelerator pedal, and motor control means for controlling the inverters to control the electric motors in response to the operation amount of the accelerator pedal;
   the electronic governor is configured to control the fuel injection amount for the prime mover on the basis of the target revolution speed and is set such that when the target revolution speed is set at least at the maximum revolution speed, the control of the fuel injection amount becomes a droop control; and
   the motor control means includes:
      first target motor horsepower calculation means for calculating a first target motor horsepower corresponding to the operation amount of the accelerator pedal;
      second target motor horsepower calculation means including speed sensing control means for modifying an available maximum horsepower for the electric motors for traveling such that the available maximum horsepower increases when the actual revolution speed of the prime mover is higher than the target revolution speed, and the increased maximum horsepower decreases with the decrease in the actual revolution speed of the prime mover, said second target motor horsepower calculation means for determining, as a second target motor horsepower, the available maximum horsepower that has been modified by the speed sensing control means;
      target motor horsepower limiting means for limiting the first target motor horsepower so that the first target motor horsepower does not exceed the second target motor horsepower, thereby to generate a third target motor horsepower; and
      inverter control means for determining a first target motor torque of each of the two electric motors on the basis of the third target motor horsepower, thereby to control the inverters.

2. The drive system for the electrically driven dump truck according to claim 1, wherein:
the speed sensing control means functions when the target revolution speed of the prime mover is set at least at the maximum revolution speed and does not function in all other cases.

3. The drive system for the electrically driven dump truck according to claim 1, wherein:
the second target motor horsepower calculation means further includes maximum horsepower calculation means for subtracting, from a maximum output horsepower which can be output by the prime mover, the loss horsepower required to drive prime mover loads other than the alternating-current generator so as to determine the available maximum horsepower for the electric motors for traveling.

4. The drive system for the electrically driven dump truck according to claim 3, wherein:
the maximum horsepower calculation means calculates the maximum output horsepower and the loss horsepower corresponding to an instantaneous actual revolution speed on the basis of a first function of the actual revolution speed of the prime mover and the maximum output horsepower, and a second function of the actual revolution speed of the prime mover and the loss horsepower.

5. The drive system for the electrically driven dump truck according to claim 1, wherein:
when a value obtained by subtracting the target revolution speed of the prime mover from the actual revolution speed of the prime mover is defined as a revolution speed deviation, the speed sensing control means calculates a horsepower modification value, which decreases with the decrease in the revolution speed deviation from a positive value to a negative value, on the basis of a third function of the revolution speed deviation and the horsepower modification value, and then modifies the available maximum horsepower for the electric motors by using the horsepower modification value.

6. The drive system for the electrically driven dump truck according to claim 5, wherein:
the horsepower modification value is a horsepower coefficient, and the speed sensing control means multiplies the horsepower coefficient by the available maximum horsepower for the electric motors, so as to determine the second target motor horsepower.

7. The drive system for the electrically driven dump truck according to claim 1, wherein:
the speed sensing control means modifies the available maximum horsepower for the electric motors such that the available maximum horsepower is increased by a factor ranging from 1.1 to 1.3 times, when the actual revolution speed of the prime mover is equivalent to the target revolution speed.

8. The drive system for the electrically driven dump truck according to claim 1, wherein:
the inverter control means calculates a first target motor torque from the third target motor horsepower and an instantaneous rotational speed of the electric motors, calculates an upper limit, of a target motor torque on the basis of an actual rotational speed of the electric motors, limits the first target motor torque so that the first target motor torque does not exceed the upper limit of the target motor torque, thereby to determine a second target motor torque, and then controls the inverters on the basis of the second target motor torque.

* * * * *